Aug. 17, 1954  R. P. BOYER, JR  2,686,841
BLOCK COUPLER

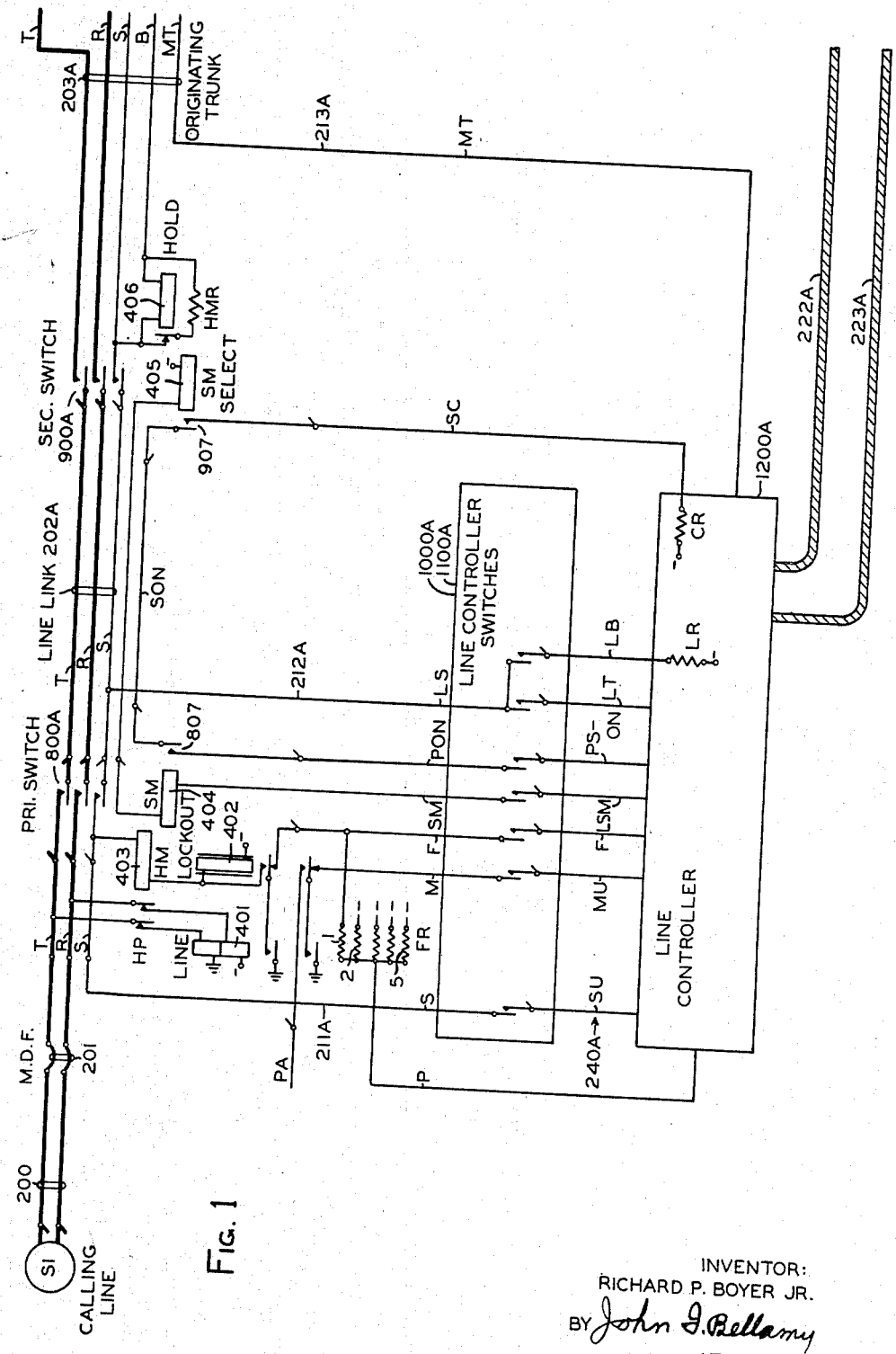

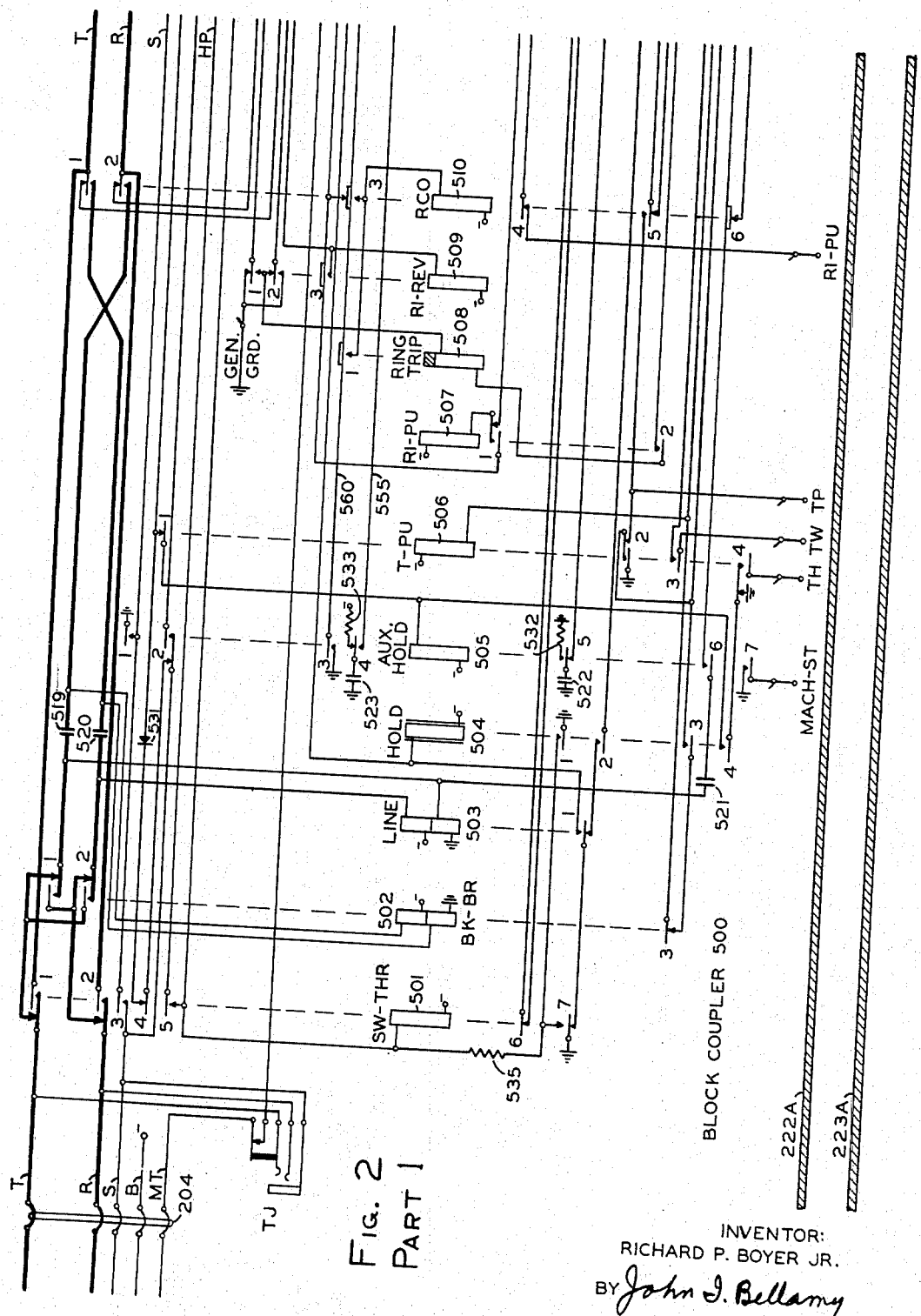

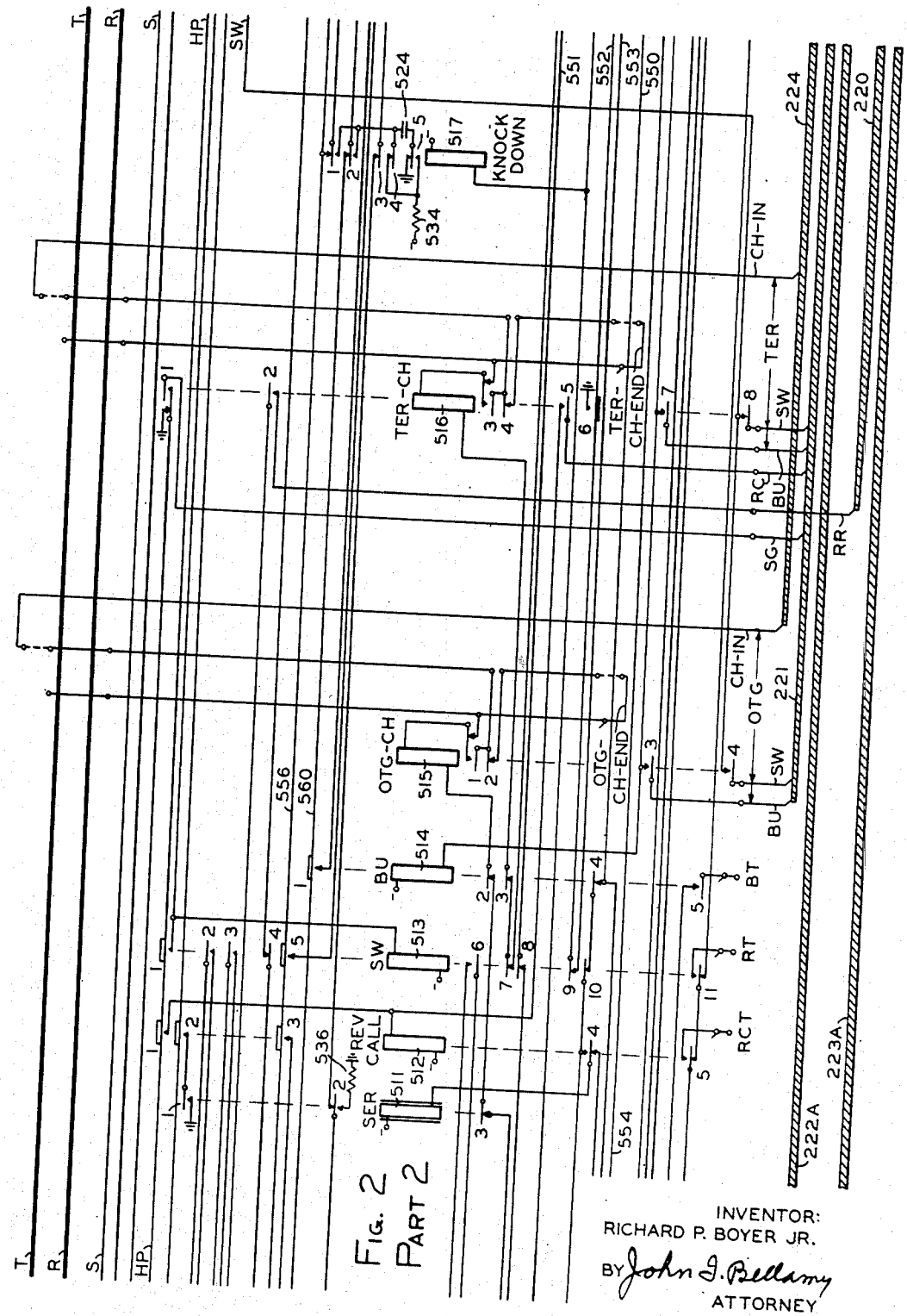

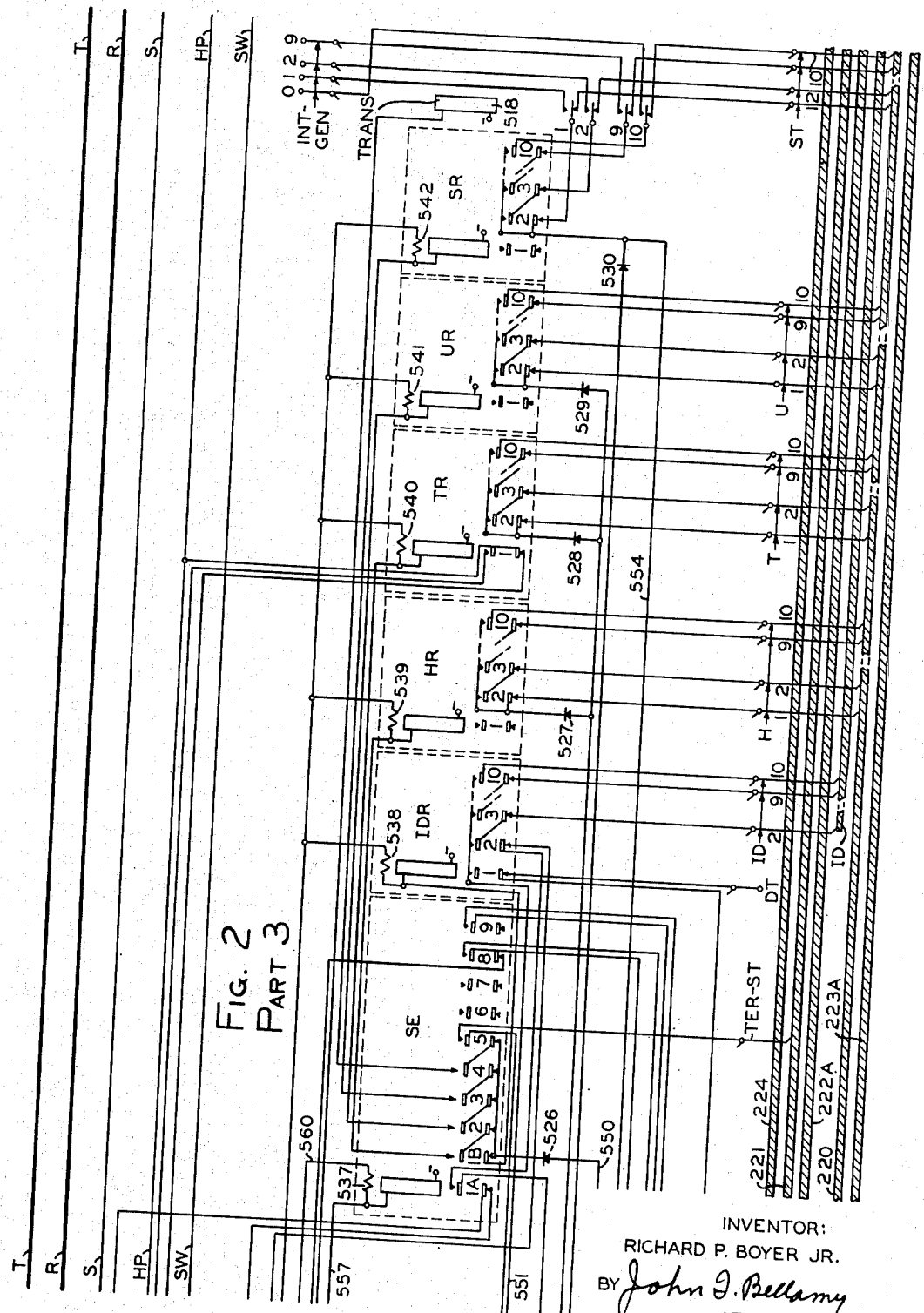

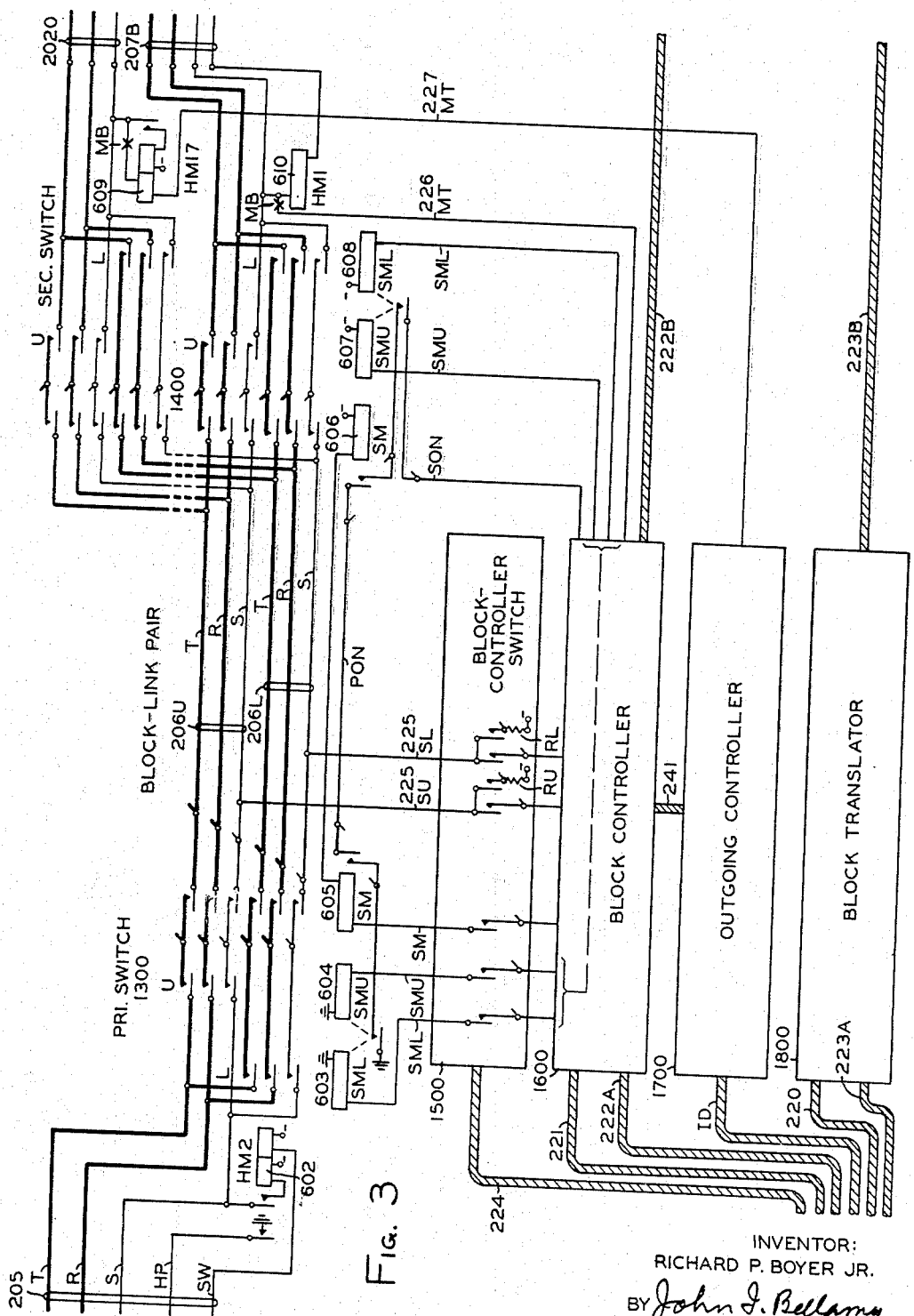

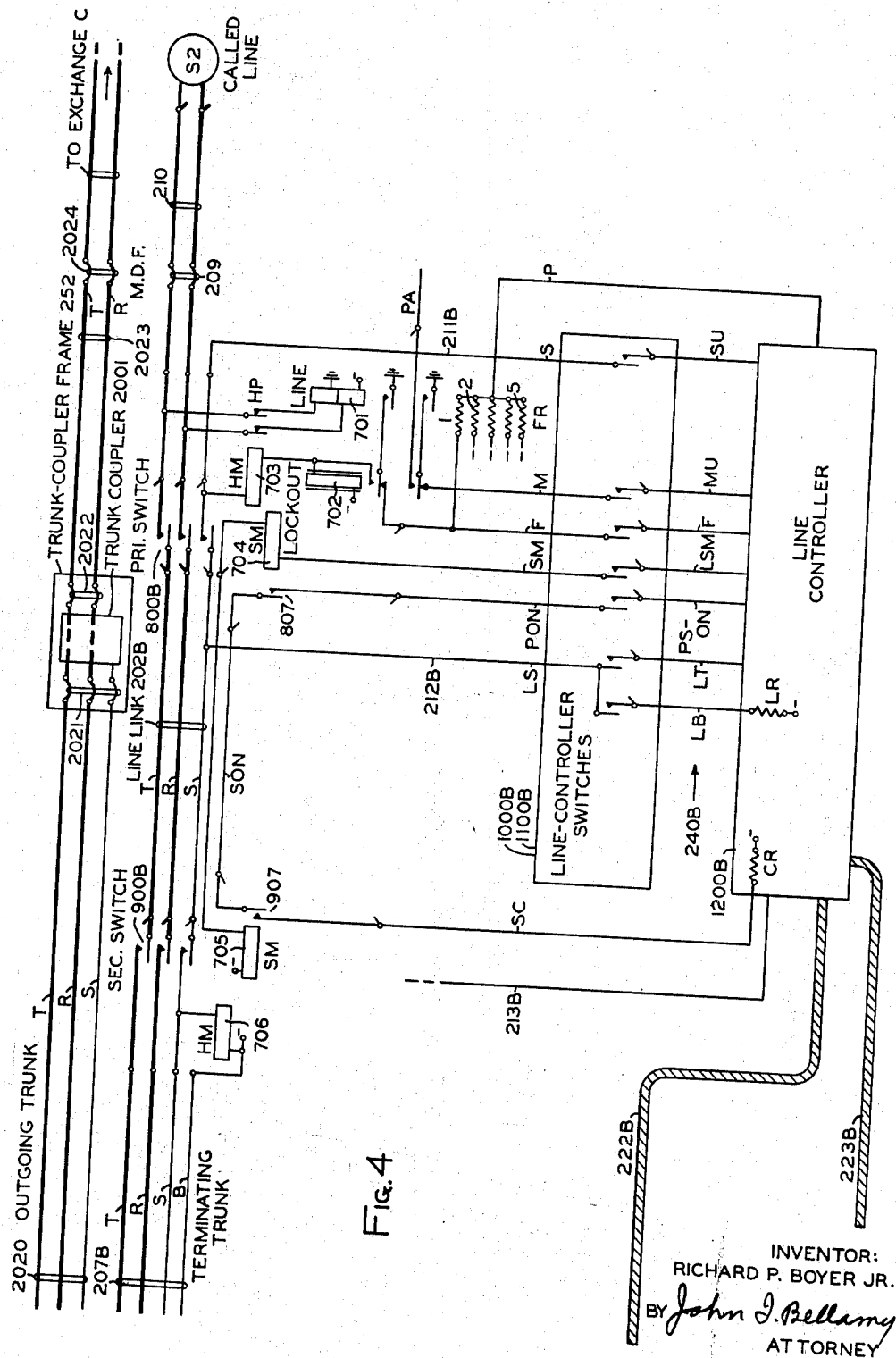

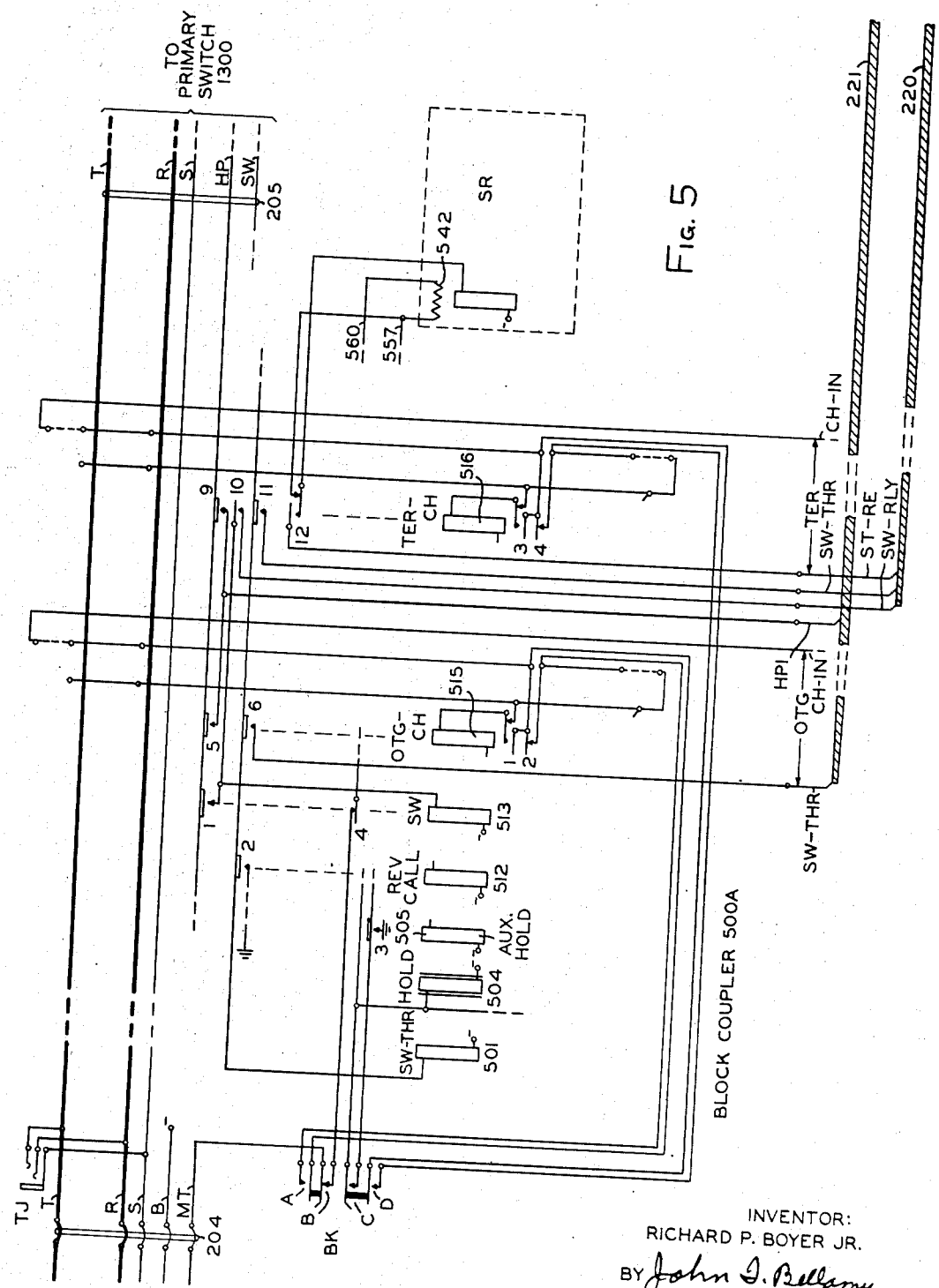

Filed Oct. 13, 1950

INVENTOR:
RICHARD P. BOYER JR.
BY John J. Bellamy
ATTORNEY

Aug. 17, 1954

R. P. BOYER, JR
BLOCK COUPLER 2,686,841

Filed Oct. 13, 1950

| FIG.1 | FIG. 2 PART 1 | FIG. 2 PART 2 | FIG. 2 PART 3 | FIG. 3 | FIG. 4 |

Fig. 8

| FIG. 5 | FIG. 6 |

INVENTOR:
RICHARD P. BOYER JR.

BY John J. Bellamy
ATTORNEY

Patented Aug. 17, 1954

2,686,841

UNITED STATES PATENT OFFICE 2,686,841

BLOCK COUPLER

Richard P. Boyer, Jr., La Grange, Ill., assignor, by mesne assignments, to International Telephone and Telegraph Corporation, a corporation of Maryland Application October 13, 1950, Serial No. 190,030

4 Claims. (Cl. 179—22)

This invention relates to a block coupler for use in a primary-secondary-spread crossbar telephone system. Its principal object is to provide a new and improved block coupler which is more satisfactory in operation than heretofore.

I. GENERAL DESCRIPTION

The improved block coupler of this invention is a direct improvement of the block couplers of the Bellamy and Bowser application, for a Primary - Secondary - Spread Crossbar Telephone System, Ser. No. 85,292, filed April 4, 1949. This Bellamy and Bowser application will be hereinafter termed the "former" application or disclosure.

Except as hereinafter pointed out, the system using the improved block coupler may be as disclosed in the said former application.

As in the former application, the block-couplers of this application are located on the block-link frame, and each include sufficient apparatus to couple its associated originating trunk, or incoming trunk, to the switchboard apparatus on the block-link frame, incidental to controlling such switching apparatus in the extension of connections responsive to the dialing of called numbers. This includes supplying talking current to the calling line and ringing and talking current to the called line, and the performance of related circuit functions as required.

Each block coupler includes a number of control relays, a sequence device operable step-by-step as the dialed digits are received, together with registers for recording the respective dialed digits. These registers include an initial digit register, registers for hundreds, tens, and units digits respectively, and a register for a stations digit dialed following the dialing of the units digits.

Specific features of this invention include the following:

(1) Preliminary "seizure" of the block coupler is performed to eliminate or reduce possible close timing difficulties between a block coupler and a line controller. The improved block coupler is arranged to become seized at the same time that the hold magnets in the line-link primary and line-link secondary switches are operated to close the transmission path;

(2) The sequence device, which distributes the series of the impulses to the counting device, is so arranged that each of its stepping impulses is of equal amplitude and equal duration of time. This is accomplished by employing an electrolytic condenser in the operating circuit of this device.

(3) Positive release of all operated armatures of the magnetic impulse counters is more readily accomplished by using a charged electrolytic condenser to supply the required flow of neutralizing current.

(4) The stepping action of the sequence device is modified to provide an additional interval (five instead of four) in the conversation time-out period, thereby providing a more accurate conversation-timing period.

(5) The input wires of the digit counters are extended thereto, from a common point, through respective rectifiers, thereby reducing switching points otherwise required.

Other specific features include the provision of lockup contacts on the coupler busy-key and improvements in the number-transfer and station-intercept operations.

Additional objects and features of the invention will appear as the description progresses.

IA. Drawings

The accompanying drawings, comprising Figs. 1 to 8, disclose preferred embodiments of the invention as follows:

Figs. 1 to 4 taken together show in detail the circuit path and intimately associated electrical equipment employed in extending talking connections from a calling line to a called line by way of a line-link and an originating trunk on line-link frame A (Fig. 1), block coupler 500 (Fig. 2, parts 1, 2, and 3), a block-link and a terminating trunk on the block-link frame (Fig. 3) and the line-link of line-link frame B (Fig. 4) containing the called line. Fig. 1 shows apparatus on line-link frame A; Fig. 2, parts 1, 2, and 3, show circuit details of the block coupler; Fig. 3 shows with some amplification, the apparatus on the block-link frame; and Fig. 4 shows the apparatus on line-link frame B.

Figs. 5 and 6 show a second embodiment of the invention with Fig. 5 comprising the modified block coupler and Fig. 6 comprising modified control apparatus on the block-link frame for use with the block coupler of Fig. 5.

Fig. 7 shows the way in which the sheets of drawing on which Figs. 1 to 4 are drawn should be arranged in order to be understood best.

Fig. 8 shows the way the sheets of drawings on which Figs. 5 and 6 are drawn should be arranged in order to be understood best.

Figure 6:
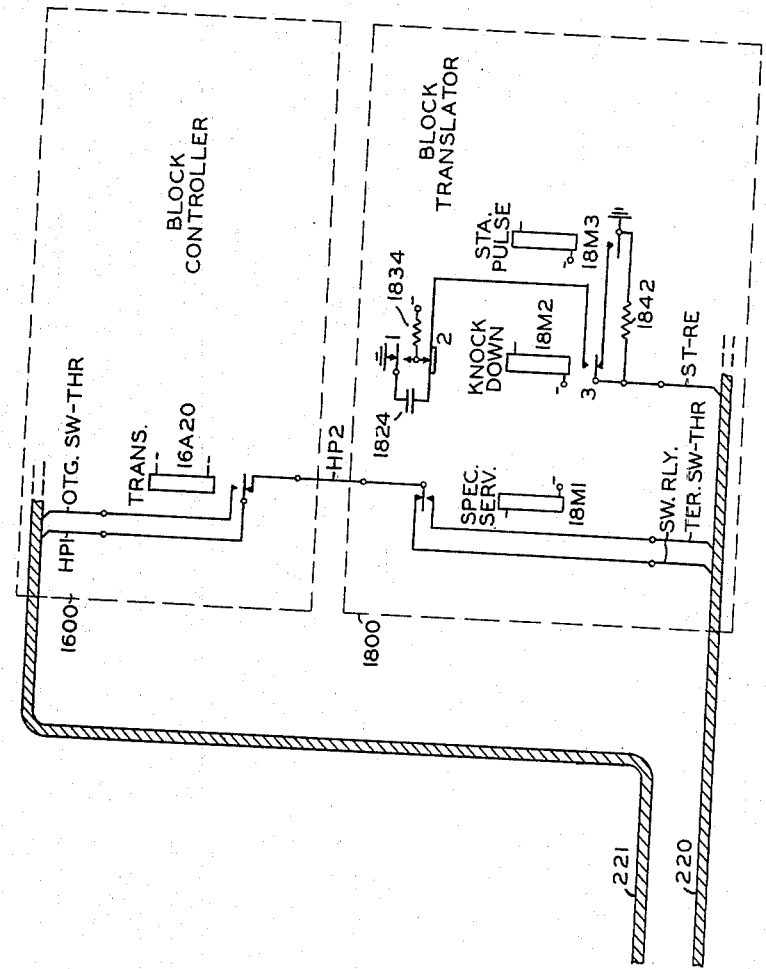

The devices shown at SE, IDR, HR, TR, UR, and SR (Fig. 2, part 3) are magnetic impulse counters which may be of the general type disclosed in Bellamy Patent 2,441,001, issued May 4, 1948, but are disclosed, with minor changes in the hold-back coil, as being of the residually-held type disclosed in Bellamy Patent 2,487,015, or in either of the following patents or pending applications of John I. Bellamy:

|   | Serial No. | Filed |
|---|---|---|
| 1 | 711,111 | Nov. 20, 1946. |
| 2 | 48,008 | Sept. 7, 1948. |

II. GENERAL OPERATION

The operations involved in extending a talking connection from a line such as 200 to a trunk such as 2020 extending to exchange C or to a line such as 210 will now be described generally.

IIA. Station S1 calls station S2

The subscriber at station S1 on line 200, to call the subscriber at station S2 on line 210, removes his receiver, waits for dial tone from a local block coupler; and then dials the directory number of staton S2, containing five digits, termed initial, hundreds, tens, units, and stations.

When the receiver is removed at calling station S1, calling line 200 is thereby bridged in the usual manner to operate the usual line relay thereof. This results in the operation of line-controller switches 1000A and 1100A to associate line controller 1200A with line-link primary switch 800A at which the calling line terminates. The line links (such as 202A) serving primary switch 800A are thereupon tested by the line controller 1200A over respective conductors 212A, and the associated originating trunks, such as 203A, are tested over respective conductors 213A. From these tests, the line controller matches an idle path for extending the calling line to an idle block coupler, the path over line-link 202A and originating trunk 203A, for example. When this occurs, the line controller causes primary and secondary switches 800A and 900A to effect a mechanical selection of the matched line link 202A, and energizes conductors 211A and 213A to close the appropriate stackups of contact elements in the primary and secondary switches 800A and 900A to extend the calling line over line link 202A to the block coupler 500, to which originating trunk 203A is connected by jumper 204. Line-controller switches 1000A and 1100A, and line controller 1200A are now returned to common use, leaving the calling line 200 connected to block coupler 500, by way of line link 202A and originating trunk 203A.

Upon receiving a dial-tone signal over the established connection, from block coupler 500, the subscriber at calling station S1 operates his usual calling device to transmit impulses representing the five digits in the directory number of called stations S2. They comprise an initial digit indexing the desired exchange, and hundreds, tens, units, and stations digits indexing the called line and the called station S2 thereon. These digits are recorded on respective registers in block coupler 500 before any external switchboard action occurs. As soon as the stations digit has been dialed, block-controller switch 1500 associates block controller 1600 with the primary switch 1300 which serves block coupler 500. At the same time, block controller 1600 is associated with block controller 1600 over the conductors in group 221. Also, at the same time, the dialed hundreds, tens, units, and stations digit information is transmitted to block translator 1800 over the conductors in group 220.

The block translator thereupon determines the line-link frame which serves the called line (line-link frame 250B), and transmits thereto (over conductors in group 223B) translated digit information indicating the primary switch (800B) which serves the called line, and indicating the specific vertical appearance of the called line on that primary switch. When this occurs, line controller 1200B identifies itself at block controller 1600, and exercises a control over conductors in group 240B to cause line-controller switches 1000B and 1100B to position themselves according to the switchboard location of the called line. The line links (such as 202B) serving primary switch 800B are now tested over respective conductors 212B, and the testing information is imparted to block controller 1600 over respective conductors in group 222B. The sleeve conductor 211B of the called line 210, is now extended to block controller 1600 over a conductor in group 222B, enabling the block controller to test the called line to determine its busy or idle condition.

If the called line tests idle, the block controller matches an idle path thereto over a block link such as 206, a terminating trunk such as 207B, and a line link such as 202B. The block links and terminating trunks are tested over respective conductors 225 and 226.

When this available idle path between block coupler 500 and the called line has been determined, block controller 1600 closes appropriate select-magnet circuits to effect mechanical selection of black link 206 at primary and secondary switches 1300 and 1400, and to effect mechanical selection of line link 202B at switches 900B and 800B. When these selections have been made, block controller 1600 operates through a conductor in group 221 to close the appropriate circuit path through primary switch 1300 to extend the connection to the selected block-link 206; operates over conductor 226 to cause the appropriate connection to be closed in secondary switch 1400 to extend block-link 206 to terminating trunk 207B, and to cause that trunk to be extended to the selected line link 202B by 900B, and operates, over a conductor in group 222B, and over sleeve conductor 211B, to cause the appropriate connection to be closed in primary switch 800B to interconnect line link 202B with the called line 210.

Upon the foregoing operations having been completed, local block coupler 500 begins to apply ringing current to the called line to signal the called station S2 thereon over the established connection across the block-link frame and across the called line-link frame, and the items of common apparatus (block-controller switch 1500, block-controller 1600, block translator 1800, and line-controller apparatus 1000B to 1200B) are promptly returned to common use, leaving the connection intact between the calling and called lines.

When the call has been answered, the subscribers at stations S1 and S2 may converse.

When both subscribers have replaced their receivers, block coupler 500 opens front and rear holding circuits which it had previously held closed, whereupon the existing connection is broken at each of the switches 800A, 900A, 1300, 1400, 900B, and 800B.

IIB. Station S1 calls exchange C

When the subscriber at station S1 on line 200 desires to call a subscriber of exchange C, he removes his receiver; waits for dial tone; and then dials the directory number of the subscriber in exchange C. This directory number includes an initial digit having a value assigned specifically to lines of exchange C.

When the receiver is removed at call station S1, the previously described operations occur to extend the calling line to an idle block coupler. It may be assumed again that the calling line is extended to block coupler 500 over line link 202A and originating trunk 203A.

When the initial digit assigned specifically to exchange C is dialed and recorded in block coupler 500, a connection is immediately thereupon completed over a wire in initial digit group ID for calling in outgoing controller 1700 and for setting it with specific regard to the trunks in the group leading to the called exchange C. This occurs coincidentally with the association of block coupler 500 with block controller 1600 over conductor group 221; and with the operation of block-controller switch 1500 over conductor group 224 to associate block controller 1600 with primary switch 1300. When the block controller and outgoing controller are both thus called in together, the block controller is adapted specifically to extend the connection to an idle trunk in the called outgoing group. The circuit arrangements are such that the operations necessary to cause the extension to be made occur with sufficient rapidity that the calling subscriber is not required to introduce an additional delay before proceeding to call the remaining digits in the desired telephone number.

If block link 206 and outgoing trunk 2020 are both idle (as shown by tests made over respective conductors 225 and 227) block controller 1600, taking into account information imparted thereto over conductors in group 241, may select that path and condition switches 1300 and 1400 to select block link 206 mechanically. Thereupon, block controller 1600 causes appropriate cross points to be closed in switches 1300 and 1400 to interconnect block-coupler extension conductors 205 with outgoing-trunk conductor 2020 by way of block link 206, thereby extending the calling line through block coupler 500, to trunk coupler 2001 on frame 252, and thence through trunk-extension 2023 and jumper 2024 to the trunk conductors outgoing to exchange C. When this occurs, block coupler 500 "switches through" as will be hereinafter explained, and the connection from the calling line to the outgoing trunk is thereafter held by trunk coupler 2001, which coupler includes apparatus for repeating the succeeding digit impulses over the trunk line to apparatus in exchange C. Coincidental with the "switching through" operation noted for the block coupler, the items of common equipment on the block-link frame (block-controller switch 1500, block controller 1600, and outgoing controller 1700) are disassociated from the established connection and are returned to common use.

The connection established from the calling line to the outgoing trunk is released responsive to operations occurring in trunk coupler 2001 when the receiver is subsequently replaced at the calling station S1.

III. FIRST EMBODIMENT (FIGS. 1 TO 4)

The operation of the system in completing calls will now be described. This part of the description covers in complete detail the operations of the portions of the apparatus directly included in the talking path through the line-link frames and the block-link frame.

IIIA. Block coupler 500

As shown in Fig. 2, parts 1, 2, and 3, local block coupler 500 includes a test jack TJ, relays 501 to 518, condensers 519 to 524, rectifiers 526 to 531, resistances 532 to 542, and magnetic impulse counters SE, IDR, HR, TR, UR, and SR.

IIIA1. Circuit functions of coupler 500

Local block coupler 500 handles only locally originated calls, which are received over its assigned originating trunk 203A, incoming from line-link frame A. According to its destination, any such call is handled as (1) an outgoing call; (2) a locally terminated call; or (3) a reverting call. Block coupler 500 performs the following principal circuit functions:

(1) Normally, it supplies idle-indicating battery potential to the sleeve conductor of its attached originating trunk.

(2.) On all calls:

2a. Upon seizure, it (1) applies dial tone to the calling line until the first digit (other than 1) is dialed and (2) removes the idle-indicating battery potential from the sleeve conductor of its attached originating trunk and substitutes a holding ground potential.

2b. If the start of dialing is delayed for the normal time-out period (about two to four minutes), it "times out" by removing holding ground from the sleeve of the attached originated trunk to permit release and lockout to occur on the line-link frame.

2c. It absorbs the initial digit 1 as many times as dialed or otherwise produced.

(3) On an outgoing call:

3a. It receives and stores a single digit for transfer to the outgoing controller.

3b. It temporarily seizes the outgoing chain of its local block-coupler section, subject to such chain being idle, and thereafter guards the seized chain against seizure by another block coupler.

3c. It transfers the single stored digit to the outgoing controller incident to seizure of the outgoing chain.

3d. On a signal from the block controller that no idle path can be matched to an outgoing trunk in the called group, it (1) applies a busy tone to calling line, and (2) frees the seized outgoing chain.

3e. On a hold-pilot signal from the block controller that the connection has been extended over a matched path to an idle outgoing trunk in the called group, it (1) switches through to the matched path, and (2) frees the seized outgoing chain.

3f. It is subsequently held by ground received over the sleeve wire of the extended connection, and clears out when such ground is removed.

(4) On a locally terminated call:

4a. It receives and stores five digits (an initial digit ID for transfer to the outgoing controller, a hundreds digit H, a tens digit T, a units digit U, and a stations digit ST for transfer to the block translator).

4b. If the dialing or answering is delayed for the normal time-out period, it times out as previously noted.

4c. It temporarily seizes the terminating chain of its local block-coupler section, subject to such chain being idle, and guards the seized chain against seizure by other block couplers.

4d. It transfers the five digits of stored digit information to the outgoing controller and to the block translator while it has the terminating chain seized.

4e. On a signal from the block controller that the called line is busy, or that no idle path thereto can be matched, it (1) applies a busy tone to the calling line, and (2) frees the seized terminating chain.

4f. On a hold-pilot signal from the associated vertical of the block-link primary switch that the connection has been extended over a matched path to the called line, it (1) applies ringing current to the called line, (2) applies ringing tone to the calling line, and (3) frees the seized terminating chain.

4g. When the call is answered, it (1) trips the ringing circuit; (2) completes the talking connection; and (3) reverses the current flow over the tip and ring conductors of the attached originating trunk, subject to hookswitch control from the called line.

4h. It supplies transmitter current to both lines.

4i. If the connection is still held by both lines at the end of the timed conversation period (about eight to ten minutes), it times out as previously noted, but applies a warning-tone pulse of busy tone current to the connection about half a minute earlier.

4j. If the connection is still held by the calling line after the called line is opened, it times out at the end of the normal time-out period.

4k. Whether the called line is still closed or not when the calling line is opened, it clears out and releases the entire connection, by removing holding ground from the incoming sleeve and from the sleeve of the forward connection.

(5) On a reverting call (wherein the calling subscriber dials the regular directory number of the called subscriber):

5a. It functions as stated in the foregoing items 4a to 4d for a normal locally terminated call.

5b. On a signal from the block controller that the call is a reverting call (a call going back to the calling line), it (1) applies a reverting-call tone to the calling line, and (2) frees the seized terminating chain.

5c. When the receiver is replaced on the calling line in obedience to the reverting-call signal, it (1) locks itself to hold the connection, and (2) sends ringing current back over its associated originating trunk to the calling line.

5d. When the reverting call is answered, it unlocks itself and clears out, removing holding ground from sleeve of its associated originating trunk to permit release and lockout to occur on the associated line-link frame.

IIIA2. *Relay functions of coupler 500*

The eighteen relays (501 to 518) of block coupler 500 have principal functions assigned thereto as follows:

Relay 501 (switch-through) switches the incoming trunk conductors through metallically to the outgoing ones on outgoing calls and reverting calls.

Relay 502 (back-bridge) operates over the called line, when a locally terminated call is answered, to reverse the incoming tip and ring conductors under control of the hookswitch on the called line, and to prevent normal time-out from taking place during conversation.

Relay 503 (line) operates when the coupler is seized, and restores thereafter, under control of the calling device or hookswitch, whenever the calling line is opened.

Relay 504 (hold) is slow-releasing, by virtue of a copper sleeve under its winding; is operated by the line relay; and remains operated during pulsing, but releases when the line relay remains restored for a substantial fraction of a second.

Relay 505 (hold-auxiliary) is operated when the coupler is preliminarily seized; it places a holding ground potential on the sleeve conductor of the attached originating trunk; it normally releases when the hold relay releases; and it operates the knock-down relay to restore all counters to normal.

Relay 506 (time-pickup) is operated as required, to start the final portion of a normal time-out period or of the conversation-time period to render a connection subject to release by the common timing apparatus.

Relay 507 (ring-pickup) is operated on locally terminated calls to complete a path for ringing current to be placed on a called line.

Relay 508 (ring-trip) is operated by direct current flow when the called line answers in order to terminate ringing.

Relay 509 (ring-reverse) is operated from the block translator on any stations digit 5 to 9, to cause ringing current to be applied to the other side of the line for divided ringing.

Relay 510 (ring-cutoff) is operated by the ring-trip relay when the call is answered, to open the ringing circuit and to close the talking circuit.

Relay 511 (series) is slow-releasing by virtue of a copper sleeve under its winding; it is operated by the line relay at the beginning of each series of impulses; it remains operated during each such series; and releases at the end of each series to operate the sequence counter.

Relay 512 (reverting-call) is operated by the block controller to condition the block coupler for a reverting call.

Relay 513 (switching) is operated when a locally-terminating connection is extended to the called line; to free the seized terminating chain; to close the ringing circuit; and the like.

Relay 514 (busy) is operated from the block controller to apply busy-tone signals to the calling line.

Relay 515 (outgoing-chain) is operated on an outgoing call when the single outgoing digit has been dialed; it seizes the outgoing chain of the local block-coupler section for the exclusive use of this block coupler.

Relay 516 (terminating-chain) is operated on a locally-terminated call when a station digit has been dialed; it seizes the terminating chain on the local block-coupler section for the exclusive use of this block coupler.

Relay 517 (knock-down) is operated when the calling line disconnects or dials the initial digit 1, to release all operated counters.

Relay 518 (transfer) is operated during the ringing period to transfer the tens leads controlled by station register SR, from the station leads associated with the block translator, to the ten interrupted-generator leads.

IIIA3. *Impulse-counter functions of coupler 500*

The six impulse counters (SE, IDR, HR, TR, UR, and SR) of block coupler 500 have principal functions assigned thereto as follows:

Impulse counter SE (sequence device) responds to the release of series relay 511 at the end of each digit series of pulses to distribute the series of digit impulses to registers IDR to SR.

Impulse counter IDR (initial-digit register) registers the number of impulses in the first digit dialed, the initial digit.

Impulse counter HR (hundreds register) registers the number of impulses in the hundreds digit.

Impulse counter TR (tens register) registers the number of impulses in the tens digit.

Impulse counter UR (units register) registers the number of impulses in the units digit.

Impulse counter SR (stations register) registers the number of impulses in the stations digit.

The following additional functions are assigned to impulse counters SE and IDR.

Sequence device SE, which actuates its contact sets 1A and 1B on receipt of its first operating pulse, disconnects the coupler idle-indicating battery as a sleeve-guarding measure; controls knock-down relay 517 for digit absorption and takes timed steps 6 to 9 incident to conversation timing.

Initial-digit register IDR opens the dial-tone lead, and also controls the absorption of the initial digit 1.

IIIB. *Locally-originated calls*

The operations involved in making locally-originated calls from station S1 on line 200 will now be described with reference to Figs. 1 to 4.

IIIB1. *Initiation of call*

When the receiver (not shown) is removed at calling station S1 of Fig. 1, the usual direct current bridge is closed across tip and ring conductors T and R of line 200, thereby operating line relay 401 through hold pilot contacts HP of the associated hold magnet 403 on line-link primary switch 800A. Line relay 401 applies ground through contacts of lockout relay 402 to mark conductor M individual to the calling line, and to fives conductor F which is common to the five lines constituting the fives group in which the calling line is located.

Grounding fives conductor F applies a ground potential through fives resistor FR–1 to primary conductor P which is common to the twenty-five lines served by primary switch 800A. There are ten such wires P on line-link frame A, a separate one for each line-link primary switch.

Grounding the conductor P illustrated in Fig. 1 causes line controller 1200A to set line-controller switches 1000A and 1100A upon the calling primary switch 800A and with specific reference to the group of five lines including the calling line. Upon being so set, the line-controller switches close the indicated open points therein. Line controller 1200A now matches an idle path from calling line 200 to an originating trunk. This path may be assumed to be over line link 202A to originating trunk 203A. The test circuit for line link 202A from line controller 1200A is from line-test conductor LT through contacts of one of the line-controller switches to link-sleeve wire LS, connected to the sleeve 202A. The test is for an idle indicating battery potential on the sleeve of the link, which is supplied through the illustrative resistor LR in the line controller, link-battery wire LB, and contacts of one of the line-controller switches. If line link 202A is busy, holding ground potential thereon marks the resistance-supplied battery potential, causing the link to test busy, but the idle indicating battery potential is effectively received by the line controller when the line link is idle.

When originating trunk 203A (being connected to block coupler 500 through jumper 204, Fig. 2, part 1) is idle, the line controller 1200A receives an idle indicating battery potential over match-test conductor MT–213A break contacts on test jack TJ, break contacts A of switch relay 513, break contacts 1A of sequence counter SE, through rectifier 531, break contacts 4 of switch-through relay 501, break contacts 2 of hold-auxiliary relay 505, over sleeve conductor S and through hold-magnet 406 in parallel with resistance HMR to battery on conductor B of originating trunk 203A. On the other hand, when originating trunk 203A is in use, the idle indicating battery potential on its sleeve conductor S is replaced by ground potential.

Upon matching a path over line link 202A to originating trunk 203A, line controller 1200A grounds link-select magnet wire LSM closing a circuit through contacts of one of the line-controller switches and over select-magnet wire SM for primary and secondary select magnets 404 and 405 which are associated with the primary end and with the secondary end respectively of line link 202A. Select magnets 404 and 405 thereupon operate to effect mechanical selection of link 202A at primary switch 800A and at secondary switch 900A. When select magnets 404 and 405 have both operated to effect the noted selection, battery potential from resistor CR in line controller 1200A is extended through contacts 907 and 807 of magnets 405 and 404 respectively to wire PON and contacts of one of the line-controller switches to the primary-secondary off-normal wire PS–ON leading to the line controller.

Upon receiving battery potential over wire PS–ON, line controller 1200A operates hold magnets 403 and 406 to extend the calling line over the selected line link 202A to the matched originating trunk 203A. Hold magnet 403 is operated by the line controller upon the application of ground potential to the illustrated sleeve-units conductor SU, which is extended through contacts of one of the line-controller switches to sleeve conductor S–211A (an extension of sleeve conductor S of the calling line), and thence to battery through hold magnet 403 and lockout relay 402 in series. Upon operating, hold magnet 403 closes the illustrated stackup of contacts of primary switch 800A to extend calling line 200 to line link 202A. Additionally, it opens its illustrated hold-pilot contacts HP to disconnect line relay 401 (in the manner of the usual cutoff relay), whereupon line relay 401 restores.

Lockout relay 402, upon operating in series with hold magnet 403, prepares for placing the associated line in lockout condition if called upon to do so.

Line controller 1200A operates hold magnet 406 by applying ground potential to match-test conductor MT–213A, closing a circuit through the winding of hold magnet 406 over the previously traced path. Upon operating, hold magnet 406 removes resistance HMR from the noted path and connects conductors T, R, and S of line link 202A respectively to the corresponding conductors of the originating trunk 203A, completing the extension of the calling line to the calling trunk. At the same time, this ground which operated hold magnet 406 is also placed through break contacts 1 of time-pickup relay 506 to the winding of hold-auxiliary relay 505. This causes a preliminary seizure of block coupler 500. The line controller 1200A maintains the operate circuits of magnet 403 and 406 closed for an interval sufficient to permit the seized block-coupler 500 to return holding ground over the sleeve conductor of the seized originating trunk 203A. Shortly thereafter, line controller 1200A clears out and permits line-controller switches 1100A and 1000A to clear out, leaving the extended connection held by ground applied to the sleeve conductor thereof by the seized block-coupler 500.

IIIB2. *Preliminary seizure of block-coupler 500*

As noted, the operating ground applied to hold magnet 406 is also applied to hold-auxiliary relay 505 causing it to operate. Make-before-break contacts 2 of relay 505 places a holding ground from contact 1 of terminating-chain relay 516 to the sleeve conductor of originating trunk 203A to maintain hold magnets 406 and 403 operated when the line controller 1200A clears out as previously noted. Preliminary seizure of the block-coupler avoids any trouble which might arise with a relay such as relay 503 (line relay, Fig. 2) being in parallel with another relay such as relay 401 (line relay, Fig. 1). If these two relays are in multiple on a long line, sufficient current is supplied for the operation of one relay but not for two.

When the described extension of a connection from calling line 200 to block-coupler 500, over line link 202A, originating trunk 203A, and jumper 204, is completed, line relay 503 operates over the calling line through break contacts 1 and 2 of relays 501 and 502. Line relay 503, at its contacts 1, operates hold relay 504 from ground at back contacts 7 of switch through relay 501.

At its contacts 4, relay 504 extends ground from break contact 4 of time-pickup relay 506 as a holding ground for relay 505 when line controller 1200A clears out. The established connection, from the calling line to the block-coupler 500, is thereby maintained after the line-controller apparatus of Fig. 1 has cleared out. At its contacts 1, hold relay 504 extends a ground through resistance 535 to the winding of switch-through relay 501 to partially energize this relay. Relay 504 at its contacts 2, prepares an operate path for series relay 511 through break contacts on relays 513, 514, 510, and 512.

Hold-auxiliary relay 505 at its contacts 7 place ground on the machine start lead; at its contact 5 prepares the operate circuit for knock-down relay 517 by discharging condenser 522 through resistance 532; at its contacts 4 it prepares an operate circuit for the sequence register SE under control of contacts 2 of series relay 511 by transferring normally charged condenser 523 to wire 555, and at its contacts 3 places a ground on locking wire 560. At its contacts 6, relay 505 extends dial tone through break contacts 1 of initial digit register IDR, contacts 11 of relay 513, contacts 5 of reverting call relay 512, through break contacts 6 of ring cut-off relay 510 and through small-capacity tone-coupling condenser 521 to the tip of the calling line.

IIIB3. *Receipt of digit-pulses*

On hearing the noted dial-tone signal, the calling subscriber dials the digit in the directory number of the called line or station.

Each time the calling device is operated to transmit a series of circuit-interruption impulses, line relay 503 is restored momentarily for each such interruption impulse in a series, comprising from 1 to 10 impulses, depending on the digit dialed.

Relay 504 remains operated and maintains relay 505 operated (contacts 4) throughout any series of impulse-induced restorations of line relay 503, relay 504 being slow-restoring because of its indicated copper sleeve.

Series relay 511 operates promptly upon the first restoration of line relay 503, its operate path being as follows: Ground on back contacts 7 of relay 501 is extended through pulsing contacts 1 of line relay 503, make contact 2 of relay 504, break contact 10 of relay 513, break contact 4 of relay 514, break contact 5 of relay 510 and break contact 4 of relay 512 to battery through the winding of relay 511. Relay 511, being slow-releasing because of the indicated copper sleeve under its winding, remains operated throughout the digit series of momentary restorations of the line relay. At its contact 2, relay 511 discharges condenser 523 through resistance 536 in preparation for operation of the sequence counter SE as will hereinafter be described.

With hold relay 504 maintained continuously operated as noted, restoration of line relay 503 delivers an impulse at its break contacts 1, through make contacts 2 of relay 513, break contacts 10 of relay 513 and break contacts 4 of relay 514 to impulse wire 550. The digit-sequence contacts, sets 1B and 2 to 5 of sequence counter SE are so inter-connected that the first series of impulses over wire 550 is transmitted to the winding of initial-digit register IDR.

When line relay 503 comes to rest, operated at the end of any series of impulses, series relay 511 shortly releases responsive to the opening of its operating circuit for a period of time greater than its hold-over time, and closes a stepping circuit for sequence counter SE.

When relay 511 releases at the end of the first series of digit impulses, its contacts 2 transfer condenser 523 from resistance ground (resistor 536) to battery through contacts 3 of relay 517 and the winding of sequence counter SE. The plates of condenser 523, having unequal potentials, cause charging current to flow through the winding of counter SE until the condenser is completely charged. This charging current generates a stepping impulse for counter SE which causes it to shift its contacts 1A and 1B to their alternate position.

Make contacts 1A of counter SE prepare the clearout circuit for all operated counters provided the initial digit dialed is the numeral 1; its break contacts 1A are opened to prevent the reapplication of idle-indicating battery to the incoming sleeve conductor of the coupler until sequence counter SE is cleared out; break contacts 1B of counter SE disconnect the incoming impulse wire 550 from the digit register IDR; and its make contacts 1B transfer this wire to the hundreds register HR.

On subsequent steps of sequence counter SE (which occur during reverting or terminating calls), its contacts 2 operate to transfer the impulse wire 550 to tens register TR; its contacts 3 operate to transfer wire 550 to units register UR; its contacts 4 operate to transfer wire 550 to stations register SR; and its contacts 5 operate to open impulse wire 550 and to close a point in the circuit of terminating-chain relay 516.

IIIB4. *Initial-digit registration*

When the impulses of the initial digit are delivered over wire 550 to the winding of the initial-digit register IDR as described, the contact sets (1 to 10) of this register are actuated successively responsive respectively to the impulses of the digit.

On receipt of the first impulse at IDR, its break contacts 1 disconnect dial-tone lead DT to prevent reapplication of dial tone. The second impulse opens break contacts 2 to open the initial-digit clearout control of the counters since the initial-digit is greater than 1, and its make contacts 2 close a point in the circuit of initial-digit wire ID2.

Subsequent impulses delivered to register IDR actuate respective contacts to position the register on the initial-digit lead (ID3 to ID10) which corresponds to the initial-digit dialed.

IIIB5. *Absorbing the initial-digit 1*

Block coupler 500 is arranged to absorb the initial digit 1 as many times as dialed or otherwise produced, as by improper hookswitch operation or by line trouble. Accordingly, the digit 1 is unassignable as an effective initial digit.

When the initial digit received contains only a single impulse, the first contact set is the only one operated in the initial-digit register IDR. Then, when sequence counter SE operates, as described, at the end of the first series of impulses comprising the initial-digit, ground from contact 3 of hold-auxiliary relay 505 is extended through break contacts 3 of relay 510, through make contacts 1A of sequence counter SE to battery through the winding of nockdown relay 517.

Relay 517 thereupon operates and at its contacts 1 and 2 removes holding ground (on wires 556 and 560) from the counters and release all operated ones by discharging condenser 524 through their windings, neutralizing any residual magnetism.

With relay 517 in its unoperated condition, condenser 524 is maintained fully charged from ground (contacts 5 of relay 517) on one plate and resistance battery on the other plate (resistor 534 through contacts 4 of relay 517). When relay 517 operates, its contacts 5 transfer the grounded plate of the condenser to the resistance battery and at the same time, its contacts 3 remove the other plate from this resistance battery while contacts 1 and 2 transfer it to battery through the windings of the counters through their respective current-limiting resistors, 537 to 542.

With resistance battery placed on both plates (resistor 534 on one plate and the windings of the counters in series with their respective current-limiting resistors on the other), and with the condenser already having a positive charge on one and a negative charge on the other, current flows until both plates have equal potentials. This condenser discharging current flows through the counters in the opposite direction from which they were originally operated causing all operated ones to release as the magnetic flux generated by the discharging current is in opposition to any residual flux and neutralizes it.

The release of sequence counter SE opens the operate circuit of knock-down relay 517 at its contacts 1A. When relay 517 releases, its contacts 1, 2, 4 and 5 transfer condenser 524 from the windings of the counters to battery and ground again in order that it again charge in preparation for another knock-down operation when required. The release of counter SE also transfers pulse lead 550 back to initial-digit register IDR.

The release of register IDR reapplies dial-tone to the calling line as a signal that the calling subscriber should start dialing from the beginning.

IIIBA. *Outgoing calls*

On the dialing of any initial digit 2 to 0, register IDR makes connection with the corresponding one of the nine initial-digit leads ID2 to ID10, which extend to the outgoing controller 1700 over cable ID. One of these leads (ID6 as illustrated in the noted former application, Fig. 17, part 2) corresponds to the initial digit assigned to the 1000-line block of local line numbers, and is rendered ineffective at the outgoing controller. The remaining ID leads extend to the block controller through respective initial-digit relays of the outgoing controller 1700 and may correspond to respective groups of outgoing trunks.

IIIBA1. *Outing call-in of block controller and marking at group controller*

When the initial digit dialed is one assigned to a group of outgoing trunks, such as those outgoing to exchange C, the release of series relay 511 at the end of the digit closes the outgoing chain to extend marking ground to the outgoing controller 1700 over the corresponding one of leads ID1 to ID10. This operation is subject to the outgoing chain being idle, in which case a ground potential is present on the outgoing-chain-in conductor of the first coupler in the block-coupler section containing the calling block coupler 500. For this section the conductor referred to is OTG-CH-IN in cable 224 incoming from block-controller switch 1500 of Fig. 3.

As illustrated and described in the noted former application, this conductor extends through chain contacts of all of the block-couplers in this section to the outgoing-chain-end conductor OTG-CH-END, multipled to all couplers of the section. Ground potential on conductor OTG-CH-END now passes through closed contacts 1 of outgoing-chain relay 515, the winding of relay 515, and through break contacts 2, 3, 6, and 8 of relays 514, 511, 501, and 513, to wire 551 which leads to register IDR. With register IDR set according to an outgoing group (such as to exchange C) wire 551 is thereby extended to the selected one of the initial-digit leads ID2 to ID10, the one which corresponds to the called group of trunks. In the noted former application, the outgoing chain circuit is thus extended through a series marking relay in the outgoing controller 1700, to battery through the outgoing-start relay of the block controller 1600. The outgoing-start relay of block controller 1600 and the series-marking relay in the outgoing controller 1700 mark the called trunk group in the outgoing controller and inform the block controller that an outgoing call has been received. The outgoing controller thereupon informs the block controller as to the busy or idle condition of each of the outgoing trunks in the called group, while the block controller proceeds to match a path across the block-link frame to an idle one of them.

IIIBA2. *Chain seizure and guarding*

In the noted former application, the concerned section-preference relay of the outgoing chain relays operates to open the outgoing chain to all other block-coupler sections, and to position block-controller switch 1500 to select the block-link primary switch 1300 which serves the block-coupler section containing the calling block coupler.

In the calling block-coupler 500, outgoing-chain relay 515 operates in the previously traced circuit to lock itself to outgoing-chain-in conductor OTG-CH-IN (at its make contacts 1), and (at its break contacts 1) it isolates the associated chain-end conductor OTG-CH-END from the chain to guard the outgoing chain from seizure by any other block-coupler in the same section, whereby the common control apparatus on the block-link frame (block-controller switch 1500, block-controller 1600, and outgoing controller 1700), is rendered temporarily individual to the calling block-coupler 500.

Outgoing-chain relay 515, at its contacts 3 and 4, connect up the common outgoing-busy and outgoing-switching wire (OTG-BU and OTG-SW) to the local wires of this coupler.

IIIBA3. *Outgoing-busy condition*

If no outgoing trunk in the called group is available (as when all trunks in the called group are busy, or when no match is possible to any idle one of them), or if an unassigned initial digit has been dialed, the block controller 1600 grounds the common wire OTG-BU (shown as in cable 221), operating busy relay 514 in the block-coupler through contacts 3 of relay 515. Busy relay 514 at its contacts 1 locks itself to ground on conductor 560 through break contacts 8 of sequence counter SE; opens the outgoing chain at its contacts 2 to release outgoing chain, relay 515, freeing the seized outgoing chain, the outgoing controller, and the block controller; opens impulse wire 550 at its contacts 4 to prevent further registration if further digits are dialed; and at its contact 5 applies busy-tone to the calling line through make contacts 6 of hold-auxiliary relay 505 and through tone-coupling condenser 521.

The calling subscriber is expected to replace his receiver upon hearing the distinctive busy tone to thereby initiate the normal release of the connection. Otherwise, the connection times out as is later described.

IIIBA4. *Outgoing matching and path selection*

Normally there is an available idle trunk in the called outgoing group, such as trunk 2020 in which even an idle path is matched to such trunk over a block-link such as 206 of the pair illustrated in Fig. 3. The idle condition of trunk 2020 is indicated in outgoing controller 1700 by idle-indicating battery potential normally applied to sleeve conductor S of trunk 2020 by trunk coupler 2001 and reaching the outgoing controller through the left-hand winding of hold magnet HM17 and match-test conductor MT-227. The busy or idle condition of block links such as 206U and 206L is determined by the block controller over respective sleeve conductors 225 extended thereto through contacts of the block-controller switch 1500. Sleeve resistors RU and RL are connected respectively to conductors 225 by the block-controller switch, thereby applying idle-indicating battery potential to each of them subject to being masked by ground potential thereon at any block link which is actually in use.

When the path over items 206U and 2020 has been determined by the matching operation of controllers 1600 and 1700, block controller 1600 closes a circuit through contacts of block-controller switch 1500 and over select-magnet wire SM of principal select magnets 605 and 606 in series. In order to effect selection of the matched upper link 206U of the illustrated pair, as distinct from the lower link 206L thereof, block controller 1600 closes a circuit from ground through the upper auxiliary select magnet SMU-604 of primary switch 1300 over the associated wire SMU and contacts of the block-controller switch, conductors and contacts in the block controller, wire SMU leading to switch 1400, and thence to battery through the upper auxiliary select magnet SMU-601. Auxiliary magnets 604 and 601 thereupon operate to complete the mechanical selection of link 206U.

An off-normal or pilot circuit now extends from ground through off-normal contacts controlled in common by auxiliary select magnets 603 and 604 of switch 1300, contacts of any one of the ten principal magnets 605, primary off-normal conductor PON, contacts controlled by any one of the ten principal select magnets 606, contacts controlled in common by auxiliary select magnets 607 and 608, and thence over secondary off-normal conductor SON to block controller 1600.

IIIBA5. *Trunk seizure and switch-through*

Upon receiving ground as noted over the associated conductor SON, block controller 1600 closes circuits to effect the extension of the connection through switches 1300 and 1400. Closure of the switch 1400 is responsive to the application of ground potential to match-test conductor MT-227 by the block controller thereby closing a circuit through the left-hand winding of hold magnet 609 and thence over sleeve conductor S of outgoing trunk 2020 to battery in trunk coupler 2001. Hold magnet 609 thereupon locks its right-hand winding to the associated sleeve conductor S, at the same time closing its principal stackup (vertically aligned with magnet 606) which partially extends both block links of the illustrated pair, and closing its upper auxiliary stackup U (aligned with select magnet 607) to extend the conductors T, R, and S, of block link 206U respectively to conductors T, R, and S of the matched outgoing trunk 2020.

The circuit closed by block controller 1600 for effecting closure of the matched connection at primary switch 1300 is over outgoing switching conductor OTG-SW (shown in cable 221), and thence through contacts 4 of outgoing-chain relay 515, switching conductor SW, and thence to battery through the right-hand winding of hold magnet HM2-602. Magnet 602 locks its left-hand winding to ground on the associated sleeve conductor S of extension group 205, and at the same time closes its associated principal and auxiliary stackups selected respectively by magnets 605 and 604. Conductors T, R, and S, in group 205 are thereby extended respectively to conductors T, R, and S in block link 206U, and then through secondary switch 1400 as stated to the corresponding conductor in outgoing trunk 2020.

Hold magnet 602 also grounds hold-pilot wire HP in group 205, thereby closing an operate circuit, through break contacts 1 of tens register TR, for switch-through relay 501 of block coupler 500.

Switch-through relay 501 operates promptly because of its pre-existing partial energization from ground at contacts 1 of hold relay 504 through resistance 535. On operating, switch-through relay 501 opens the closed outgoing chain at its contacts 6, thereby initiating the clearing out of the common apparatus 1500, 1600, and 1700 and restoring outgoing-chain relay 515.

At its contacts 1 and 2, relay 501 switches the tip and ring conductors of the attached originating trunk through metallically to conductors T and R of extension group 205, now extended across the block link frame to the trunk coupler 2001 (Fig. 4) associated with the seized outgoing trunk. The line and release relays (not shown in Fig. 4) thereupon operate in the seized trunk coupler, whereby holding ground is applied to the sleeve wire at that point to maintain the extended connection.

Line relay 503 of block-coupler 500 is disconnected and restored by the described switch-through operation, relay 504 restoring after a slight interval. Hold-auxiliary relay 505 is released at contacts 4 of hold relay 504 and removes the local holding ground connection from the sleeve conductor, leaving the established connection held by the seized trunk coupler. At its contacts 5, relay 505 places discharged condenser 522 to the winding of knock-down relay 517. Condenser 522 charges from current flowing through the winding of relay 517 causing it to operate and remain operated until condenser 522 is charged. The operation of relay 517 neutralizes the holding flux of all operated counters, as previously described for initial-digit 1 absorption, thereby releasing counter SE and IDR. Relay 501 is the only relay now held operated in block coupler 500.

The impulses constituting the remaining digits in the called number are repeated at trunk coupler 2001 of Fig. 4 as described in the noted former application.

IIIBA6. *Outgoing-call clearout*

When trunk coupler 2001 clears out responsive to the receiver being replaced on the calling line, it removes ground from the sleeve conductor of the established connection thereby breaking down the connection by releasing the primary and secondary hold magnets 602 and 609, lock-out relay 402, and hold magnets 403 and 406.

The release of primary hold magnet 602, ungrounds the associated hold-pilot conductor HP to release switch-through relay 501 of coupler 500.

The release of switch-through relay 501 completes the clearing out of the block coupler 500. At contacts 4 of relay 501, idle-indicating battery is again placed on the sleeve conductor.

IIIBB. *Terminating calls*

When following the described seizure of block coupler 500, the initial digit dialed is the digit 6, serving as a 1000 digit to index the local block 1000 line numbers as described in the former application, the corresponding initial digit lead ID6 (not shown in the Fig. 2, part 3) is selected by initial digit register IDR by being connected to conductor 551 through make contact 6 and break contact 7 (not shown) of register of IDR. Lead ID6 stands open in the outgoing controller (as shown in Fig. 17, part 2, of the noted application), wherefore outgoing-chain relay 515 is not operated, and none of the common equipment is taken for use at this time.

IIIBB1. *Registering digits H, T, U, and ST*

The dialing of the initial digit is followed by the dialing of the hundreds, tens, units, and station digits in the called number. They are registered respectively on registers HR, TR, UR, and SR, being transmitted from conductor 550 to these registers, through rectifier 526, make contacts 1B, 2, 3, and 4 respectively of device SE. Device SE advances to position 5 (operate its contacts 5) at the end of the registration of the stations digits to disconnect the operating circuit of stations register SR and to call in the block controller.

IIIBB2. *Terminating call-in of block controller*

When sequence device SE takes its fifth step, at the end of dialing of a stations digit, its break contact 5 opens the impulse circuit of register SR to guard against the possibility of further dialing, and its make contacts 5 connect up the common terminating-start wire TER–ST of the block controller. If the terminating chain is closed at the section-preference relays (Fig. 15, part 1 of the noted application) and is closed at this block coupler section, ground potential through a relay and contacts of the section-preference relays is extended to the terminating-chain-in TER–CH–IN conductor, in cable 224, to the first coupler of this section, and extends thence (through the chain contacts 2 of relay 515 of each) to the end conductor of the chain, TER–CH–END which is common to all couplers of the section. The ground on the latter conductor is now extended through the closed contacts 3 and the winding of relay 516, break contacts 3 and 7 of relays 514 and 513, and make contacts 5 of counter SE to terminating-start wire TER–ST, shown as a conductor of cable 221. As shown in the noted application, wire TER–ST extends to battery through the terminating start relay in the block controller, which now operates to prepare the block controller for handling a locally terminated call.

IIIBB3. *Chain seizure and guarding*

Over the above traced circuit, the concerned section-preference relay is operated to set block controller switch 1600 on block-link primary switch 1300, and to guard the common terminating chain against seizure at any other block coupler section. Terminating-chain relay 516 is operated in a traced circuit, in this block coupler, to seize the terminating chain to guard it against seizure by any other coupler in the same section, by locking itself (at its make first contacts 3) to the associated chain-in wire, TER–CH–IN, and isolating TER–CH–END from the chain at break contacts 3 and 4.

Terminating-chain relay 516, at its break contacts 1, disconnect the sleeve conductor of the attached originating trunk from ground and at its make contacts 1 transfers it to ground on sleeve-ground conductor SG of the block controller, pursuant to the reverting-call test; and at its contacts 5, 7, 8, and 2, respectively connect up reverting-call wire RC, the terminating-switch wire TER–SW, and the terminating-busy wire TER–BU of the block controller, and ring-reverse wire RR of the block translator.

IIIBB4. *Digit-setting of block translator*

Relay 516 at its contacts 6 further effects the setting of the block translator in accordance with the registered hundreds, tens, units, and station digits, by grounding leads 552 and 553, thereby grounding the previously selected one of the leads of the groups H, T, U, and ST, through respective rectifiers 527, 528, 529, and 530. These leads extend to the block translator over cable 220. The station leads ST extend to the block translator from the register SR through break contacts 1 to 10 of transfer relay 518.

IIIBB5. *Divided-ringing control*

If any station digit 0, 1, 2, 3, or 4 has been dialed, ring-reverse relay 509 does not operate, but it is operated by the block translator (over ring reverse wire RR as described in the noted former application) if the station digits information received thereby shows that any station digit 5 to 9 has been dialed. When it is thus operated, relay 509 reverses the ringing leads at its contacts 1 and 2, and at its contacts 3 it locks itself to ground on wire 560 through break contacts 3 of ring-cut-off relay 510.

IIIBB6. *Testing the called line*

As described and illustrated in the former application, the block translator transmits a suitably translated version of the hundreds, tens, and units digits to the line controller on the line-link frame at which the called line terminates. The station digit information is used only for the noted ringing control purposes and for station selection.

If the illustrated station S2 is the one called, it is served by a frame which includes apparatus shown in Fig. 4. In this event, the translated digit information is sent to line controller 1200B over conductors in cables 223B.

On receiving the translated digit information indicating which primary switch (primary switch 800B, Fig. 4) serves the line being called, and indicating the fives and units location of the called line thereon, line controller 1200B identifies itself at block controller 1600 by a signal transmitted over a conductor in group 222B and positions line-controller switches 1000B and 1100B in accordance with line-link primary switch 800B and in accordance with the fives group thereon in which called line 210 is located.

When switches 1000B and 1100B have been set, one of them extends the sleeve conductor S-211B of the called line over sleeve-units wire SU-240B to line controller 1200B, whence it is extended over a conductor in cable 222B to the block controller 1600 to enable the called line to be tested as to its busy or idle condition. At the same time, each of the ten link sleeves associated with the called primary switch 800B is connected to the line controller through one of the line-controller switches. For example, the sleeve of the illustrated link is connected through link-sleeve wire LS-212B and link-test wire LT. Link resistor LR is connected to this sleeve conductor over conductor LB and other contacts of the line-controller switches to provide an idle-indicating test potential on the sleeve of the link unless the link is in use. The busy or idle condition of the line link serving primary switch 800B is separately indicated to block controller 1600 over respective conductors in cable 222B.

IIIBB7. *Terminating-busy operation*

On testing the called line, if block controller 1600 finds it busy, or finds that no idle path can be matched thereto, the block controller grounds its terminating-busy lead TER–BU (shown in cable 221), thereby operating busy relay 514 in the block coupler through contacts 7 of terminating-chain relay 516. Relay 514, at its make contacts 1 locks itself to ground on wire 560 through break contacts 8 of sequence counter SE; opens its contacts 3 to release relay 516 and to free the terminating chain; closes its contacts 5 to apply busy-tone current to the calling line from busy-tone wire BT through make contacts 6 of relay 505 and tone-coupling condenser 521.

If the calling subscriber does not replace his receiver in response to the returned busy-tone signal to thereby cause the connection to be cleared out normally, the connection is cleared out under control of the common timing apparatus at the end of the normal time-out period, as will hereinafter appear.

IIIBB8. *Called-line seizure*

If the called line is idle, and if an idle path can be matched thereto, block controller matches such a path, such as over block link 206U, Fig. 3, terminating trunk 207B, and line-link 202B.

As described, block-link 206U is selected mechanically at switches 1300 and 1400 by the operation of select magnets 604 to 607, whereupon they cooperate to ground conductor SON to signal block controller 1600. Line-link 202B is selected mechanically by the operation of select magnets SM–705 and SM–704. Their circuit is closed at the block controller over a wire in cable 222B, through line controller 1200B, wire LSM, a contact pair of one of the line-controller switches, the associated select-magnet wire SM, and thence to battery through magnets 704 and 705 in series.

With magnets 705 and 704 operated, a signal is transmitted to block controller over a circuit path from battery at control resistor CR of the line controller 1200B series contacts of magnets 705 and 704, contacts of a line-controller switch, associated wire PS–ON, and thence to the block controller over a wire in cable 222B.

Upon receiving the noted signals that the select magnets have operated on the block-link and line-link frames, block controller 1600 grounds the sleeve of the called line 210 (Fig. 4) over the noted test extensions thereof, thereby operating hold magnet HM–703 in series with lockout relay 702. Magnet 703 disconnects line relay 701 and connects the called line to the selected line link 202B. Block controller 1600 also grounds the sleeve wire of the matched terminating trunk 207B (by way of wire MT–226), thereby operating magnet HM1–610 on the block-link frame and secondary hold magnet HM–706 on the line-link frame. Block link 206U is thereby extended over conductors T, R, and S of trunk 207B to line link 202B. Block controller 1600 also grounds its switching wire TER–SW (shown in cable 221), closing a circuit through contacts 8 of relay 516 of block coupler 500 and over conductor SW extending therefrom, to operate the associated primary hold magnet HM2–602 to complete the connection over the matched path to the called line. Hold magnet HM2–602 also closes its local contacts to ground hold-pilot conductor HP which operates switching relay 513 through make contacts 1 of tens register TR.

Upon operating, switching relay 513 opens its contacts 7 to restore terminating-chain relay 516 and free the terminating chain and the common apparatus. Contacts 6 complete the operate path for ring-pickup relay 507; contacts 10 open the impulse wire 550 to prevent further dialing; contacts 5 operate transfer relay 518 to disconnect the ten output leads of station register SR from station leads ST of the block translator and transfer them respectively to the 10 interruptor-generator leads INT–GEN 1 to 9 and INT–GEN 0; contacts 2 and 3 of relay 513 close the ringing circuit to the called line; contacts 1 lock relay 513 operated to the HP lead; contacts 9 remove ground from the make contacts of register SR in preparation for generator current to be placed through these contacts to the calling line; and its contacts 11 apply ringing-tone to the calling line from the common lead RT through contacts 5 of relay 512, contacts 6 of ring-cut-off relay 510, make contacts 6 of relay 505 and through tone-coupling condenser 521 to inform the calling subscriber that the ringing operation has begun.

IIIBB9. *Ringing the called station*

The block couplers and their associated common ringing apparatus provide for accommodating up to ten harmonic-ringing stations, either bridged or divided ringing, on any party line by (1) employing a one-ring code and a two-ring code for each of five frequencies of ringing current, and by (2) ringing over one line wire or the other according to the station called, as shown in the following ringing chart:

RINGING CHART

| Stations Digit | Frequency | |
|---|---|---|
| 0 | 1 | |
| 1 | 2 | |
| 2 | 3 | 1 short on tip wire. |
| 3 | 4 | |
| 4 | 5 | |
| 5 | 1 | |
| 6 | 2 | |
| 7 | 3 | 2 shorts on ring wire. |
| 8 | 4 | |
| 9 | 5 | |

The foregoing ringing arrangement provides:
(1) Semi-selective (one-ring and two-ring) service for ten bridged stations (ringers bridged across the line); and
(2) Full selective service for ten divided-ringing stations (the ringers of 1-ring stations 0 to 4 connected between the tip conductor and ground, and the ringers of 2-ring stations 5 to 9 connected between the ring conductor and ground).

In order to provide the foregoing party-line ringing service, ten interrupted-generator leads INT–GEN 0 to 9 are so controlled by the usual common ringing apparatus (not shown) that Nos. 0, 1, 2, 3, and 4 have respective frequencies 1 to 5 applied thereto once during each ringing cycle, and interrupted-generator leads Nos. 5 to 9 have the respective frequencies 1 to 5 applied thereto twice during each ringing cycle.

The ringing circuit is from the selected one of the generator leads INT–GEN 0 to INT–GEN 9, through the associated make contacts of transfer relay 513, the associated contacts of station register SR, conductor 554, make contacts 2 of ring-pickup relay 507, when operated from ground on ring-pickup wire RI–PU and locked to wire 560 through contacts 1 and contacts 3 of relay 510, and through the winding of ring-tip relay 508, to (1) the tip conductor T of the called line (if stations digit 0 to 4 has been dialed, and ring-reverse relay 509 is therefore not operated) through break contacts 2 of relay 509, make contacts 3 of relay 513, and break contacts 1 of relay 510, or (2) the ring conductor R of the called line of stations digit 5 to 9 has been dialed and ring-reverse relay 509 is consequently operated, through make contacts 1 of relay 509, make contact 2 or relay 513, and break contacts 2 of relay 510.

A return path for the transmitted ringing current is provided (1) over the ring conductor R (when relay 509 is not operated) through break contact 2 of relay 510, make contacts 2 of switch relay 513 and through break contacts 1 of relay 509, to generator ground conductor GEN–GRD or (2) over the tip conductor T (when relay 509 is operated) through break contacts 1 of relay 510, make contacts 3 of relay 513 and make contacts 2 of relay 509 to conductor GEN–GRD.

Ring-trip relay 508, whose winding is included in the ringing circuit does not operate before the call is answered, for each ringer (not shown) on the called line has the usual condenser in series therewith to block direct current flow, and because the shading collar surrounding the armature end of the core of relay 508 keeps it from responding to the alternating ringing current.

In order to permit ring-trip relay 508 to be operated by direct current flow during the application of ringing current (if the call is then answered), any applied frequency of ringing current is in series with (super-imposed on) the free pole of the usual grounded exchange battery.

IIIBB10. *Ring-cutoff operation*

When the call is answered at the called station S2 on line 210, the closure of the usual talking bridge across the called line causes direct current to flow thereover from the generator battery lead GEN–BATT to ground over the generator lead (INT–GEN 0 to INT–GEN 9) in use, operating ring-trip relay 508. At its contacts 1, relay 508 places ground on the ring-cutoff relay 510 thereby operating it.

At its contacts 1 and 2, ring cut-off relay 510 opens the ringing circuit and completes the talking circuit; its contacts 3 remove the locking ground from ring-pickup relay 507 permitting it to release and locks ring-cutoff relay 510 operated; in addition to releasing ring-pickup relay 507, it also releases relays 509 and 518; its contacts 4 open the operate circuit of ring-pickup relay 507 to prevent its further operation; at its contacts 6 open the ring-tone lead RT to remove ringing-tone current; at its contacts 5, transfer the winding of series relay 511 to time pulse lead TP, incidental to conversation timing.

IIIBB11. *Answered supervision*

Back-bridge relay 502 now operates over the called line. It interchanges the incoming tip and ring conductors to reverse the current flow over the calling line to serve any required supervisory function, and at its break contacts 3 opens and restores time pick-up relay 506 (if operated) to prevent normal time-out.

During conversation, the following six relays (timing relays excluded) of block coupler 500 are energized:
(1) Back-bridge relay 502
(2) Line-relay 503
(3) Hold-relay 504
(4) Hold-auxiliary relay 505
(5) Ring-cutoff relay 510
(6) Switching relay 513

IIIBB12. *Terminating-call clearout*

If the called subscriber (station S2, Fig. 4) is the first to replace his receiver at the end of the conversation, back-bridge relay 502 thereupon restores, reversing the current flow over the called line back to its normal direction, reconnecting relay 506 to start a new normal time-out period.

When the receiver is replaced on the calling line, line relay 503 restores and (at its make contact 1) open-circuits hold relay 504, which restores a moment later, removing ground potential (at its make contacts 4) from the hold-auxiliary relay 505 permitting it to release.

Relay 505 at its contacts 2, remove ground potential from sleeve conductor S of the established connection thereby clearing it out, by the release of the primary and secondary hold magnets 403 and 405 on the calling line-link frame, primary and secondary hold-magnets 602 and 610 on the block-link frame, and secondary and primary hold magnets 706 and 703 on the called line-link frame. The release of primary hold magnet 602 on the block-link frame ungrounds hold pilot conductor HP, restoring switching relay 513. At its contacts 3, hold relay 505 removes the locking ground from wire 560 permitting ring-cutoff relay 510 and transfer relay 518 to release. At its contacts 5, relay 505 places discharged condenser 522 to battery through the winding of knock down relay 517, causing this relay to operate from condenser charging currents through its windings. Contacts on relay 517 place condenser 524 in the circuit of the counters, as previously described for clear-out when the initial digit 1 is dialed, thereby neutralizing the holding flux in all operated counters causing them to release. The release of counter SE replaces the idle-indicating battery on the sleeve of the originating trunk, completing the clearing out of the block coupler.

IIIBC. *Reverting call*

To make a reverting call (call another station on the same line with the calling station), the calling subscriber removes his receiver; responds to dial tone by dialing the regular directory number of the called station; replaces his receiver upon hearing a distinctive reverting-call tone prompting him so to do; waits a reasonable time for ringing current to be applied to the line to signal the called station; and then again removes his receiver for conversation. It may be assumed, for the purpose of this description, that the subscriber at station S1 has become connected to block coupler 500 as described, and has dialed the number of another station on calling line 200.

When block coupler 500 is used for a reverting call, its operation is as described for a terminating call, up to the point when the common apparatus on the block-link frame has been called in, after the complete number has been dialed and registered on registers IDR to SR. This includes the operation of terminating-chain relay 516 which, among other things, makes the described substitution (at its contacts 1) of the grounded sleeve-ground conductor SG of the block controller for the local source of holding ground normally applied to the sleeve conductor S incoming to the block coupler 500.

In the present example, since the number dialed is that of a line (200) served by line-link frame A as shown in Fig. 1, block translator 1800 sends the translated equivalent of the hundreds, tens, and units digits of the called number over wires in cable 223A to line controller 1200A, which responds as described for line controller 1200B to set line controller switches 1100A and 1100B appropriately, thereby closing a test extension of sleeve conductor S of the called (and calling) line 200 to the block controller 1600 over conductor S-211A, line-controller contacts, conductor 240A, and a wire in cable 222A.

IIIBC1. *Conditioning the block coupler for the reverting call*

The holding ground maintained on the sleeve of calling line 200 by block coupler 500 causes that line to test busy when the block controller 1600 tests it over the described extended sleeve connection. Before treating the called line as normally busy when it tests busy as stated, the block controller inserts a resistor in series with its sleeve-ground wire SG (shown in cable 222A). Since ground is now being held on the sleeve conductor S of the connection over wire SG, through make contact 1 of relay 516, a partial battery potential is thereby caused to appear on the sleeve conductor S of the calling line. The appearance of this potential on the line being tested characterizes the call as a reverting call.

Reverting-call ringing is a ring-back process not requiring a connection forward from the block coupler. Therefore, the block controller now performs no matching operation, but forthwith grounds its switching conductor SW and reverting-call conductor RC (shown in cable 221), thereby operating reverting-call relay 512 along with primary hold magnet 602 on the block-link frame. Since matching has not occurred, no select magnet is operated at switch 1300. Therefore, hold magnet 602 operates only its hold-pilot contacts (shown immediately to the left thereof), grounding wire HP to operate switching relay 513.

Relay 512 restores relay 516 to free the terminating chain; closes the ringing circuit to the unextended outgoing tip and ring conductors T and R of the coupler; and performs its other previously noted functions. Reverting call relay 512 at its contacts 1, locks itself to the ground on hold-pilot conductor HP; at its contacts 3, closes the holding circuit for hold relay 504 to lock the connection against release during revertive-call ringing when the called subscriber disconnects; and at its make contact 5, it places reverting-call tone on the called line from tone conductor RCT to prompt the calling subscriber to replace his receiver to initiate the reverting-call ringing.

IIIBC2. *Inverting the block coupler*

When the receiver is placed on the calling line, responsive to the receipt of reverting-ringing tone, line relay 503 is restored but hold relay 504 remains operated through the noted contacts 3 of reverting-call relay 512.

Relay 511 operates from ground at make contacts 7 of relay 501, through back contacts 1 of relay 503 which releases responsive to the calling party momentarily disconnecting, through contacts 2 of hold relay 504, and through make contacts 4 of reverting-call relay 512. At its contact 1, series relay 511 places ground through make contacts 2 of reverting call relay 512 to operate switch-through relay 501. Relay 501, at its contacts 1 and 2, inverts the block coupler for operation as a ring-back source, by disconnecting the incoming tip and ring conductors from their normal input connections and transferring them to the unextended outgoing tip and ring conductor. The ringing current applied to such unextended outgoing conductors as previously described (through contacts of the operated switching relay 513), is now extended back to the calling line, signalling the called station thereon. The relays are now operated on block coupler (during reverting-call ringing excluding timing relays) are relays 501, 504, 505, 507, 511, 512, 513, and (if the registered station digit is 5 to 9) relay 509.

IIIBC3. *Answering clearout*

When the receiver is removed at the called station on line 200 or when it is removed at calling station S1 after the elapse of sufficient time for a reverting-call ringing to have occurred, ring-trip relay 508 is operated over the subscriber line as previously described. At its contacts 1, it extends the ground on common ground wire 560 to operate ring-cutoff relay 510. Ring-cutoff relay 510 locks to this ground through its contacts 3 while its break contacts 3 releases ring-pickup relay 507 (if operated), relay 501, and relay 518. Its contacts 1 and 2, disconnect the ringing circuit and substitute back-bridge relay 502, which operates but only momentarily as will appear.

Relay 510 at its break contacts 3, also releases hold relay 504 which in turn releases relay 505. This operation clears out the connection by opening the holding circuit of hold magnet 403, 406 and 602. Magnet 602 unground the associated hold-pilot conductor HP releasing relays 512 and 513.

When hold-auxiliary relay 505 restores, knockdown relay 517 is operated from the charging current of condenser 522, as previously described, to cause a neutralizing impulse to be delivered to the counters to release all operated ones.

Block coupler 500 is again returned to its idle condition.

IIIBC4. *Reverting-call lockout*

At the link-link primary switch 800A, Fig. 1, when ground is removed from the sleeve conductor S of the established connection, slow restoring lockout relay 402 is still operated when hold magnet 403 restores and reconnects line relay 401. Ordinarily, this operation occurs with the associated line unbridged, wherefore line relay 401 does not respond, and relay 402 restores after its momentary delay interval. But, line 200 is now bridged at one or both of the calling and called stations thereon, wherefore line relay 401 immediately reoperates upon being reconnected. At its inner contacts, line relay 401 locks relay 402 operated, and the locking ground passes through the winding of hold magnet 403 to the associated sleeve conductor S to mark the line busy during the reverting-call conversation. At the lower front contacts of relays 401 and 402, ground is placed on the common permanent-alarm conductor PA as a signal that at least one line is bridged or grounded, and stands thereby locked out of normal service.

When the reverting-call conversation is terminated, and receivers have been replaced at both stations, relays 401 and 402 restore successively, terminating the locked-out condition of line 200.

IIIBD. *Timing-out provisions*

The previously referred to timing-out provisions of block coupler 500 comprise:

1. Permanent timing which comprises releasing the connection to free the block coupler when seized from a line which is "permanent" (has a trouble condition simulating a call) or which becomes permanent before the connection is released; and 2. Conversation timing which comprises releasing the connection to free the block coupler when the conversation period exceeds a predetermined time interval.

A line may become "permanent" (acquire a relatively permanent calling or holding condition) because of substation or line trouble (a short, a cross, or a ground), or because the receiver is not replaced after use, or is accidentally dislodged. A line is treated as permanent whenever the answering is delayed for a period longer than the assigned normal time-out period.

The timing-out provisions are controlled by a common time-out timer (not shown) from which common conductors TP, TH, and TW (time-pulse, time-hold, and time-warn) are connected. Time-hold conductor TH is normally grounded at the timer, and conductors TP and TW are normally ungrounded.

The time-out timer is arranged to pass through a cycle of operations in one-fifth of the timed conversation period. During any such cycle it (1) reaches clearout position wherein it momentarily ungrounds TH, (2) almost immediately reaches pickup position wherein it momentarily grounds TP, and (3), near the end of its cycle, it momentarily grounds conductor TW.

For clarity, it will be assumed that the time-out timer has a two-minute cycle. Then, as will hereinafter appear, (1) the normal time-out period (for permanent timing) is two minutes, plus a pre-pickup interval ranging from 0 to 2 minutes, and (2) the conversation time-out period is ten minutes, plus a pre-pickup period of from 0 to 2 minutes.

IIIBD1. *Permanent timing*

Permanent timing starts at block coupler 500 when hold relay 504 is first operated by line relay 503, upon seizure of the coupler. Contacts 3 of relay 504 (to which relay 506 is normally connected by contacts 3 of relay 502) connect relay 506 to conductor TP through contacts 2 of relay 506.

1a. *Pre-pickup period*

A variable pre-pickup interval starts with the noted operation of relay 504, and lasts until the time-out timer next reaches its pickup (or starting) position. This pre-pickup interval, for a two-minute timer, ranges from 0 to 2 minutes, depending on where the timer is within its cycle when relay 504 operates. The variable pre-pickup period begins with the operation of relay 504 and lasts until relay 506 operates.

1b. *Two-minute time-out interval*

If relay 504 is still operated when the timer reaches its pickup position, the consequent grounding of lead TP (by the timer) operates time-pickup relay 506 (through make-before-break contacts 2 of relay 506, make contacts 3 of relay 504, and break contacts 3 of relay 502). At its make-before-break contacts 2, relay 506 locks to ground locally and disconnects its winding from the temporarily grounded lead TP, and at its contacts 4, it transfers the locking ground of relay 505 from its local source of holding ground to the normally grounded time-hold conductor TH.

1c. *Timing out*

If hold relay 504 remains operated continuously (relay 502 not operated), time-pickup relay 506 is still held locked operated when the timer next reaches its time-out position. Then the noted temporary ungrounding of conductor TH by the timer removes holding ground from relay 505, releasing it. The connection is thereby cleared out as ground is removed, at its contacts 2, from the sleeve conductor S of block coupler 500; the calling line is locked out of normal service until cleared (as described under "Reverting-call lockout"); and the block coupler is released and returned to common used as previously described when relay 505 restores.

When a busy condition is encountered, on either a locally-terminated or an outgoing call and the calling line does not disconnect, the connection is released thereafter at the end of the current normal time-out period.

When switching relay 513 operates to start the ringing period (on a normal terminating call, or on a reverting call), it similarly causes the invariable release of the connection if ringing is still in progress at the end of the normal time-out period.

When a normal terminating call is answered, back-bridge relay 502, at its contacts 3, disconnects relay 506 to cancel permanent timing during conversation. But, when the called subscriber replaces his receiver ahead of the calling subscriber, relay 502 restores and recloses its contacts 3 to start a new normal time-out period, provided the connection is still held by the calling line.

IIIBD2. Conversation timing

When a normal terminating call is answered, and the conversation period starts (relays 510 and 502 operating), contacts 3 of back-bridge relay 502 disconnects the permanent-timing circuit of time-pickup relay 506 (as above noted) to cancel permanent timing during conversation. At its contacts 5, relay 510 starts the conversation-timing period by transferring the winding of relay 511 to time-pulse lead TP. This transfer occurs with counter SE in its fifth position, contact sets 1A, 1B, and 2 to 5 operated.

The conversation-timing time-out period comprises a variable pickup interval, followed by five cycles of the common timer. If a two-minute timer is used, the pickup interval ranges from 0 to 2 minutes, and the following five-cycle interval is ten minutes.

When the common timer next reaches its pickup position, it transmits an impulse over lead TP to the winding of relay 511, thereby operating it for a small interval of time. This momentary operation of relay 511 advances device SE to its sixth position (operates its contact set 6) as described when charged condenser 523 is discharged through the winding of device SE, thereby beginning the fixed five-cycle conversation-time interval.

The next two pulses on lead TP advance device SE to its seventh, and eighth positions respectively. Break contacts 8 of SE open a point in the locking circuit of busy relay 514, and make contacts 8 of SE prepare to operate relay 514 from conductor TW during the final cycle of the period.

When device SE is driven to its ninth (final) position, it shunts the time-disconnect contacts 3 of the operated back-bridge relay 502, whereupon time-pickup relay 506 operates on the next time pulse, and locks as described. At its make contacts 2, relay 506 renders time-hold conductor TH the source of holding ground for relay 505 which in turn holds ground on the sleeve conductor of the connection, thereby starting the fifth and final one-cycle interval of the fixed conversation-time period.

If the connection is still maintained during this final one-cycle interval, then when the common timer reaches its warning position (say half a minute before its cutoff position), a short application of ground to time-warn conductor TW operates busy relay 514 (through make contacts 3 of relay 506, and make contacts 8 of device SE) to make a temporary application of busy-tone current to the talking path from busy-tone lead BT, through make contacts 5 of relay 514, make contacts 6 of relay 505 and condenser 521. The conversing subscribers are thereby warned that the connection is shortly to be released. Busy relay 514 does not lock itself operated at this time because break contacts 8 of SE are open.

If the conversation is still in progress when the common timer next reaches its time-out position, the resulting momentary ungrounding of conductor TH removes ground potential from relay 505 allowing it to release and remove ground from the sleeve conductor of the connection, thereby clearing out the connection and causing both involved lines to be locked out, as described for line 200, until the receivers are replaced thereon.

IIIBE. Test jack TJ

Test jack TJ is adapted to receive a three-conductor test plug (not shown) when a test connection is desired to the incoming tip, ring, and sleeve conductors of block coupler 500. When such a plug is inserted, the break contacts thereof open the connection through which idle-indicating battery potential is normally supplied to line controller 1200 from the sleeve conductor S of the connected originating trunk 203A, thereby causing the block coupler and this trunk to test busy to line controller 1200A for the duration of the test connection. When desired, a dummy plug may be inserted into jack TJ to cause the coupler 500 and trunk 203A to test busy.

IV. SECOND EMBODIMENT (FIGS. 5 AND 6)

The second embodiment of this invention (shown in Figs. 5 and 6) provides a further improved block coupler for use in the extension of connections from a calling line-link frame to a called line-link or trunk-coupler frame. Features of the second embodiment reside in arrangements whereby:

(1) Stations on lines may be moved from one line terminal to another and yet can be reached by dialing either the original or new telephone number;

(2) A typical trunk circuit may be connected to a subscriber's line terminal; and (3) The coupler may be held after the calling line disconnects in order that any test operation which might be necessary may be performed.

Fig. 5 shows a partial circuit diagram of the block coupler 500 modified, and Fig. 6 shows a partial circuit diagram of portions of the control apparatus on the block-link frame. The circuit parts omitted are assumed to be as shown in Figs. 2 and 3.

IVA. Resetting the station register

In order to transfer an individual station from one line terminal to another without changing the ringing frequency, or to transfer an individual station from one line terminal to another and provide a new ringing frequency, by dialing either the old (listed) number or the new number (which will appear in the next directory listing), the number-transfer circuit described in the noted former application must be modified.

To accomplish either of the noted transfers and still maintain the old directory number, the stations register in the block-coupler must be reset according to the new location of the transferred station. This resetting of the stations registers will now be described with reference to Figs. 5 and 6.

As described in the first embodiment, terminating chain relay 516 is operated on a terminating or reverting call. In addition to its previously described functions, its contacts 12 transfer the holding and stepping circuit of stations register SR from stations register pulsing wire 557 to station reset wire ST-RE, extending to block translator 1800 over cable 220. Ground through resistor 1824 (block translator 1800 of Fig. 6) on wire ST-RE maintains register SR in its originally-dialed position.

The common equipment required for resetting the stations registers includes a "knock-down" relay 18M2 for restoring the register in the block couplers, and a station pulsing-relay 18M3 for generating pulses for advancing the stations register to its new required position.

The common equipment required for resetting the stations registers is energized by a detector relay pair (shown in the former application) when the stations digit dialed requires station register reset. Energization of the common equipment causes knock-down relay 18M2 to operate and at its contacts 1, 2 and 3, to transfer the station reset wire ST-RE from resistor 1842 to condenser 1824 in such a manner as to produce a flow of current of reversed polarity through the winding of the stations register SR causing all armatures to be released. Shortly thereafter the knock-down relay 18M2 releases and remains unoperated in order to close the pulsing or stepping circuit at its contacts 3. The knock-down of the stations register is of the same principle described in the first embodiment for sequence counter knock-down.

The release of knock-down relay 18M2 causes station-pulsing relay 18M3 at its contacts 1 to generate a series of pulses which are extended to the stations register over wire ST-RE.

When the proper number of pulses have been delivered over wire ST-RE, station-pulsing relay 18M3 at its contacts 1 remove the pulsing ground from station reset wire ST-RE. With the stations register at its new setting (corresponding to the location of the transferred station), the block translator overrides the fixed translation the normal way.

IVB. Special service circuits

Special service in the block coupler permits a typical trunk to be connected to a subscriber line terminal. In order to accomplish this, the switch-through relay in the block coupler circuit must operate and transmission battery and ground for the connection must be furnished from the trunk circuit.

As described in the first embodiment, the block coupler circuit sets itself up initially for either an outgoing or a terminating call by operating either the outgoing-chain relay 515 or terminating-chain relay 516. The outgoing-chain relay 515 permits operation of either switch-through relay 501 or busy relay 514 and completes the connection to a "single digit" trunk circuit with the aid of the block controller and the outgoing controller.

The terminating-chain relay 516 extends control leads from the common equipment to busy, reverting call, switching, and switch-through relays in the block coupler and completes the connection to a subscriber's line terminal, either as an ordinary local call as previously described or through special service equipment operations, as a through connection to a trunk circuit connected to that line terminal, as will hereinafter be described.

IVB1. Outgoing call

As described in the first embodiment on an outgoing call, ground is extended over outgoing-switch lead OTG-SW to block-primary switch 1300 over switch wire SW. This ground causes the associated hold magnet to close its hold-pilot spring stack to place ground on the hold-pilot wire HP to the block coupler. This ground is extended through contacts 5 of outgoing chain relay 515 over hold-pilot wire 1 HP-1 in cable 221 to block controller 1600 (Fig. 6), through make contacts on transfer relay 16A20 (Fig. 6) which is operated on an outgoing call and back to the block coupler over outgoing switch through lead OTG-SW-THR in cable 221. This ground on the outgoing-switch-through lead passes through make contacts 6 of outgoing-chain relay 515 to operate switch-through relay 501. Operation of switch-through relay 501 on an outgoing call completes the connection and dismisses the common control equipment as described in the first embodiment.

IVB2. Terminating call

As described in the first embodiment, terminating chain relay 516 is operated on all terminating or reverting calls. When an idle path is found for completion of a local call, block controller 1600 places ground on terminating-switch wire TER-SW which operates the associated primary switch 1300 on the block-link frame as described in the former application. Hold-pilot contacts places ground on hold-pilot wire HP which is extended through make contacts 9 of terminating-chain relay 516 to block-controller 1600 over hold-pilot 1 lead HP-1 the same as described for an outgoing call. On a terminating or reverting call, transfer relay 16A20 of block controller 1600 (Fig. 6) is not operated, hence this ground on wire HP-1 is extended through break contacts on relay 16A20 to wire HP-2 which is connected to block translater 1800.

If special trunking is not required on a call to a subscriber's line terminal (as determined by the detector field), the special service relay 18M1 in block translater 1800 is not operated and this ground on HP-2 lead is extended to the block coupler over switch relay lead SW-RLY in cable 220.

This lead, SW-RLY, is extended through make contacts 10 of terminating-chain relay 516 to operate switching relay 513. This causes the call to be handled as a local call and releases the common control equipment.

IVB3. Special trunk connection

If intercept or special trunking is required on a call to a subscriber line terminal, the detector field causes relay 18M1 in block transmitter 1800 of Fig. 6 to operate and switch the noted ground on wire HP-2 through its make contacts to terminating-switch-through wire TER-SW-THR in cable 220. This ground is extended through contacts 11 of terminating-chain relay 512 to operate switch-through relay 501. When switch-through relay 501 operates, the tip and ring of the calling line is cut through metallically to the calling subscriber's line. The call is now handled as a trunk call and as described in the first embodiment operation of the switch-through relay 501 releases the common equipment.

IVB4. Reverting call

In the event that the terminating call is a reverting call, the line controller upon determining that the call is a reverting call, grounds both switch-relay and reverting-call leads SW-RLY and RC respectively, operating switching relay 513 and revertive-call relay 512 as described in the first embodiment independent of the apparatus illustrated in Fig. 6. The call is treated as a reverting call and the common apparatus is cleared out.

IVC. *Coupler and busy key*

Operation of the busy key when the coupler is in an idle condition will cause contacts sets A, C, and D to close while contact B opens. Break contact B removes the idle-indicating battery from match test wire MT to indicate to the line controller that this coupler is busy.

When the block coupler of Fig. 5 is seized, either the terminating chain relay 516 or outgoing chain relay 515 is operated in addition to the auxiliary-hold relay 505 which operated from the preliminary block coupler seizure as described in the first embodiment. If the coupler key or bypass key is then operated and the calling party disconnects, ground from contacts 3 of auxiliary-hold relay 505 through closed contacts C of the coupler busy key maintain relay 504 operated. Hold relay 504 maintains the connection intact in order that any test operations necessary may be performed. Contacts B of the busy key prevent the line controller from seizing this busy coupler.

Contacts A and D shunt contacts 2 and 4 of relay 515 and 516 respectively to complete the outgoing or terminating chain so that other block couplers in the section containing the coupler with the busy key operated, can seize the common equipment. The coupler bypass key is mounted on the switchboard so as to permit any coupler to be removed from the coupler frame for servicing purposes and yet maintain the section chain intact so that the remaining couplers in the section are not disabled.

Restoration of the coupler busy key or bypass key restores the idle-indicating battery on the sleeve conductor, preparing the coupler for use on another call.

I claim:

1. In a switching system, a group of lines, a group of trunks over which calling ones of said lines may be extended, switches, a line controller common to said lines, trunks, and switches, means controlled by said line controller, responsive to a calling condition on any said line, for operating one of said switches to extend the calling line to an idle one of said trunks, each trunk including a match-test conductor extending to said line controller, each trunk having a relay associated with its said match-test conductor for holding any concerned one of said switches operated, control means associated with any said relay for placing an idle-indicating potential on the associated match-test conductor subject to the trunk being idle, means in said line controller for ascertaining the busy or idle condition of any trunk, according to the potential on its match-test conductor, means controlled by the line controller coincidental with the operation of the concerned one of said switches by the line controller for applying an operating potential to the match-test conductor of the concerned trunk to operate the said relay thereof to hold the last said switch operated.

2. In a switching system, a group of lines, a group of trunks over which calling ones of said lines may be extended, tandem-related primary and secondary switches interposed between the lines and trunks, a line controller common to said lines, trunks, and switches, means controlled by said line controller, responsive to a calling condition on any said line, for operating a concerned primary switch and a concerned secondary switch to extend the calling line to an idle one of said trunks, each trunk including a match-test conductor extending thereto from said line controller, each trunk having a relay associated with its said match-test conductor for holding any concerned one of said switches operated, control means associated with any said relay for placing an idle-indicating potential on the associated match-test conductor subject to the trunk being idle, means in said line controller for ascertaining the busy or idle condition of any trunk according to the potential on its match-test conductor, means controlled by the line controller coincidental with the operation of the concerned one of said primary switches by the line controller for applying an operating potential to the match-test conductor of the concerned trunk, said operating potential serving to operate the concerned secondary switch and to operate the said relay of the trunk to hold the concerned primary and secondary switches operated.

3. In a switching system, a switchboard, block couplers occupying a section of said switchboard, trunks associated with said block couplers, first switching apparatus for extending incoming connections over respective trunks to said block couplers, second switching apparatus for further extending said connections to called lines, means in any block coupler controlled over the calling line and extended connection for closing a holding circuit for the said first switching apparatus to maintain the concerned extended connection, means in any said block coupler controlled over a calling line for registering the number of a desired called line, control apparatus common to all said couplers for controlling said second switching apparatus to extend the concerned connection under the control of said registering means, chain relays in the respective block couplers, each chain relay being operable over a chain circuit through all said block couplers including normally closed contacts on each said chain relay to connect the associated block coupler to the said common control apparatus and to preclude coincidental operation of any other said chain relay by opening said chain circuit, said couplers being individually removable from said switchboard for replacement or repair, and coupler by-pass keys mounted on said switchboard for the respective couplers, each key having contacts closable on operation of the key for by-passing the said chain around the associated coupler to permit operation of the chain relays of the remaining couplers when one coupler is removed from the switchboard, each said by-pass key having additional contacts effective on operation of the key to close an independent circuit for holding any connection which may be establishable to the associated block coupler.

4. In a switching system, lines comprising a group of first lines and a group of second lines, block couplers and switching means for extending connections respectively therethrough to any desired ones of said lines, each block coupler having a control wire and two relays corresponding respectively to said groups of lines, control apparatus common to said block couplers and means for rendering it temporarily individual to any one of them, means in the common apparatus for operating said switching apparatus to extend a connection from the individualized block coupler to any one of said lines, means in the common apparatus for connecting the control wire of the individualized block coupler with the one of said relays thereof which corresponds to the said group which contains the line to which the connection has been extended, and means controlled by the said operation of the switching apparatus for energizing the last said control wire to operate the connected relay.

References Cited in the file of this patent

UNITED STATES PATENTS

| Number | Name | Date |
|---|---|---|
| 1,721,607 | Stewart | July 23, 1929 |
| 2,255,816 | Rotscheidt | Sept. 16, 1941 |
| 2,354,660 | Bellamy | Aug. 1, 1944 |
| 2,388,488 | Malthaner | Nov. 6, 1945 |
| 2,416,710 | Myers | Mar. 4, 1947 |
| 2,452,051 | Hersey | Oct. 26, 1948 |
| 2,510,062 | Bray et al. | June 6, 1950 |
| 2,538,817 | Bellamy | Jan. 23, 1951 |
| 2,541,936 | Powell | Feb. 13, 1951 |